United States Patent
Shimamura et al.

(10) Patent No.: US 6,246,484 B1
(45) Date of Patent: Jun. 12, 2001

(54) IMAGE READING APPARATUS AND INFORMATION PROCESSING APPARATUS HAVING IMAGE READING FUNCTION

(75) Inventors: Yoshiyuki Shimamura; Tetsuya Ishikawa, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/755,207

(22) Filed: Nov. 22, 1996

(30) Foreign Application Priority Data

Nov. 22, 1995 (JP) .................................................... 7-328294
Jan. 5, 1996 (JP) .................................................... 8-000281
Nov. 21, 1996 (JP) .................................................... 8-310706

(51) Int. Cl.$^7$ .............................. G06F 15/00; H04N 1/04; G06K 9/40
(52) U.S. Cl. .......................... 358/1.12; 358/498; 382/274
(58) Field of Search ..................................... 358/1.12, 1.1, 358/1.4, 1.5, 1.9, 1.18, 496, 494, 498, 486, 296; 382/315, 312, 319, 274; 347/40, 41, 44, 50; 346/76.1

(56) References Cited

U.S. PATENT DOCUMENTS

| | | | |
|---|---|---|---|
| 4,970,531 | * | 11/1990 | Shimizu et al. ................. 346/76 DH |
| 5,757,403 | * | 5/1998 | Nagashima ............................. 347/50 |
| 5,802,217 | | 9/1998 | Suzuki et al. ......................... 382/274 |
| 5,805,183 | * | 9/1998 | Lidice et al. ............................. 347/41 |
| 5,880,852 | * | 3/1999 | Asano et al. .......................... 358/296 |
| 5,903,401 | * | 5/1999 | Tanaka et al. ........................ 358/474 |
| 5,917,620 | | 9/1998 | Hasegawa et al. ................... 358/513 |

FOREIGN PATENT DOCUMENTS

| | | |
|---|---|---|
| 59-99860 | 6/1984 | (JP) . |
| 59-99864 | 6/1984 | (JP) . |
| 59-228464 | 12/1984 | (JP) . |

* cited by examiner

Primary Examiner—Madeleine Nguyen
(74) Attorney, Agent, or Firm—Fitzpatrick, Cella, Harper & Scinto

(57) ABSTRACT

An image reading apparatus includes reading means for reading out a document arranged in a reading position for its conversion into image signals, a reference member, correction means for correcting the image signals converted by the reading means, carrying means for guiding the document to the image reading position, expelling means for expelling the document from the image reading position, and controlling means for controlling and obtaining the corrected data from the correction means by guiding the reference member by use of the carrying means to the image reading position in order to read by use of the reading means the regions of the reference member not in contact with the expelling means. With this structure, it is possible to prevent the reference member from being stained, and execute the correction of converted image signals accurately for the enhanced implementation of image reading function for this apparatus, and an information processing apparatus provided with such image reading function as well.

21 Claims, 22 Drawing Sheets

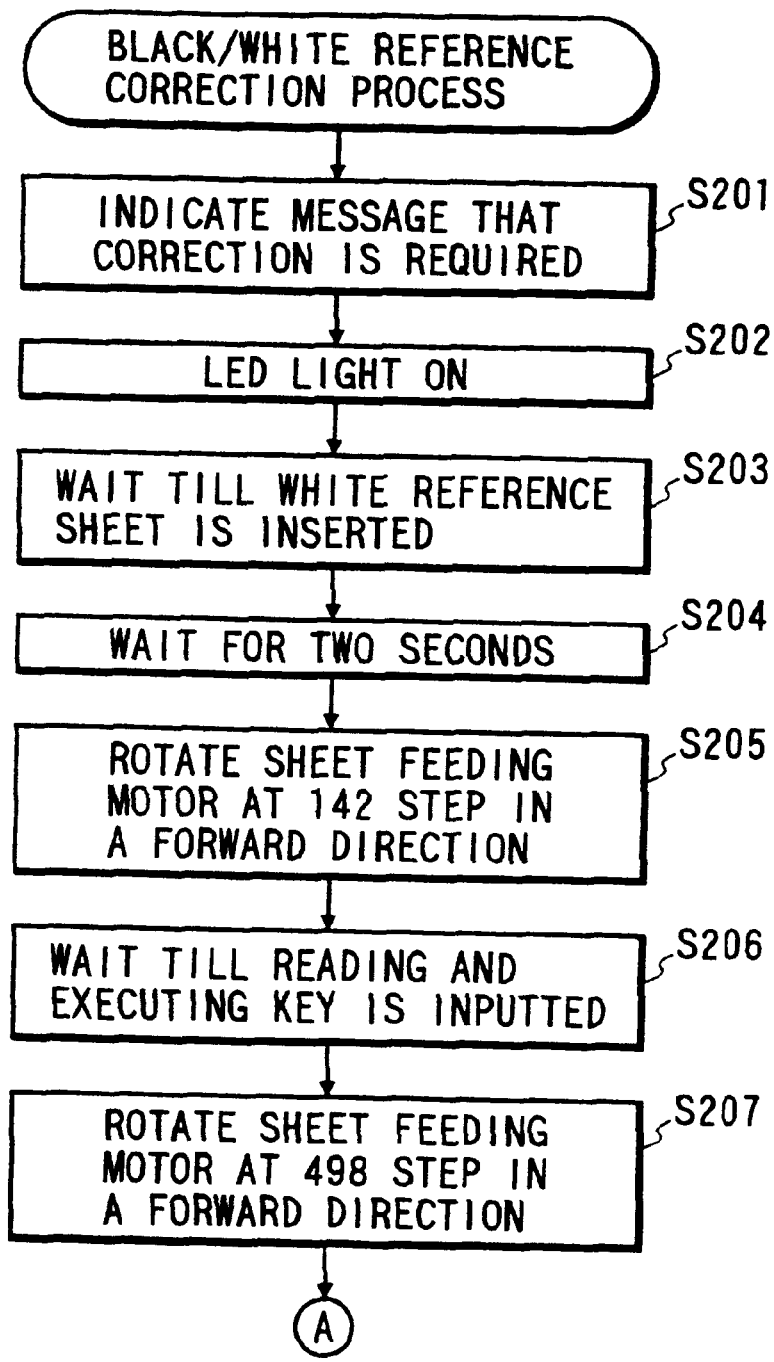

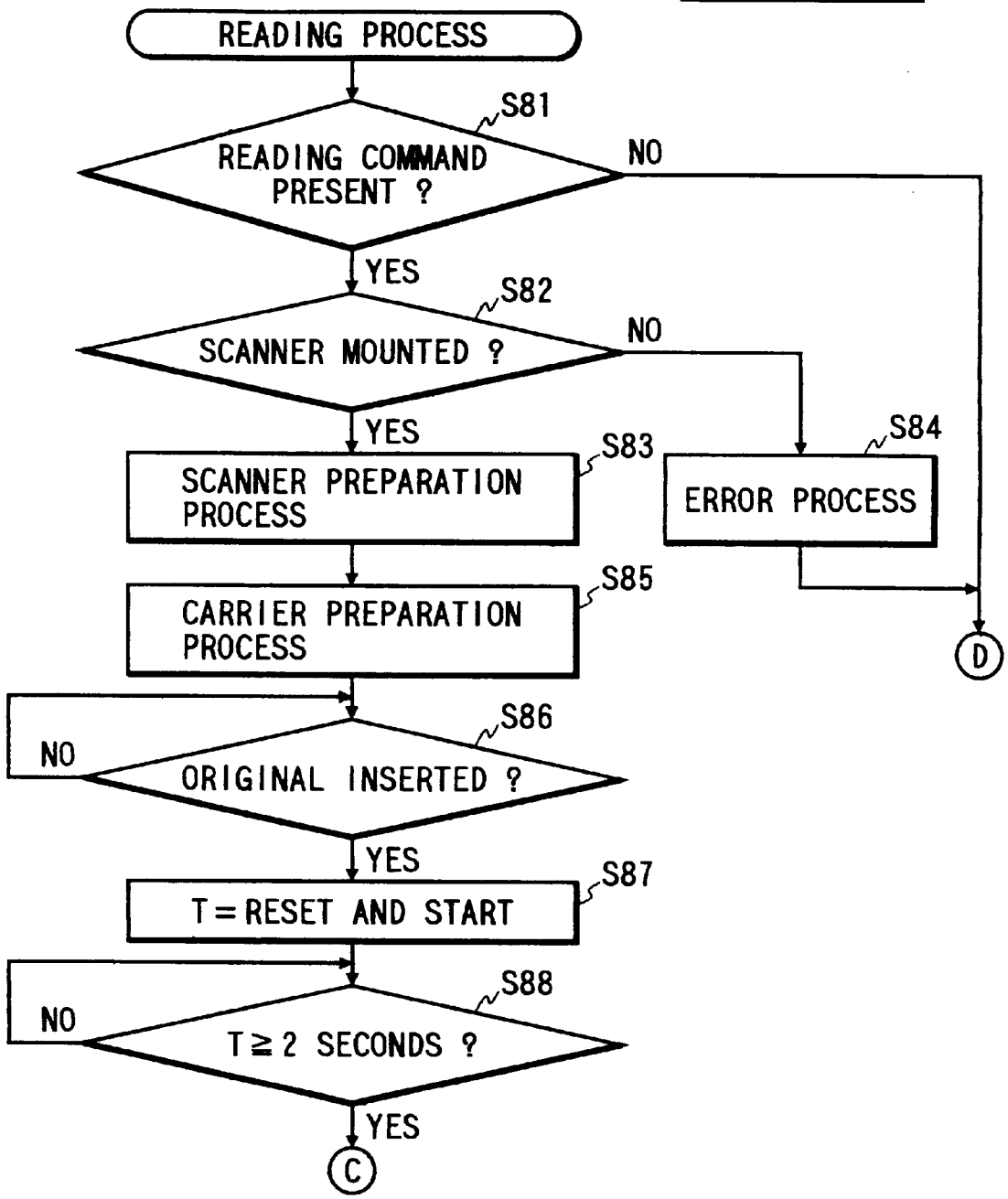

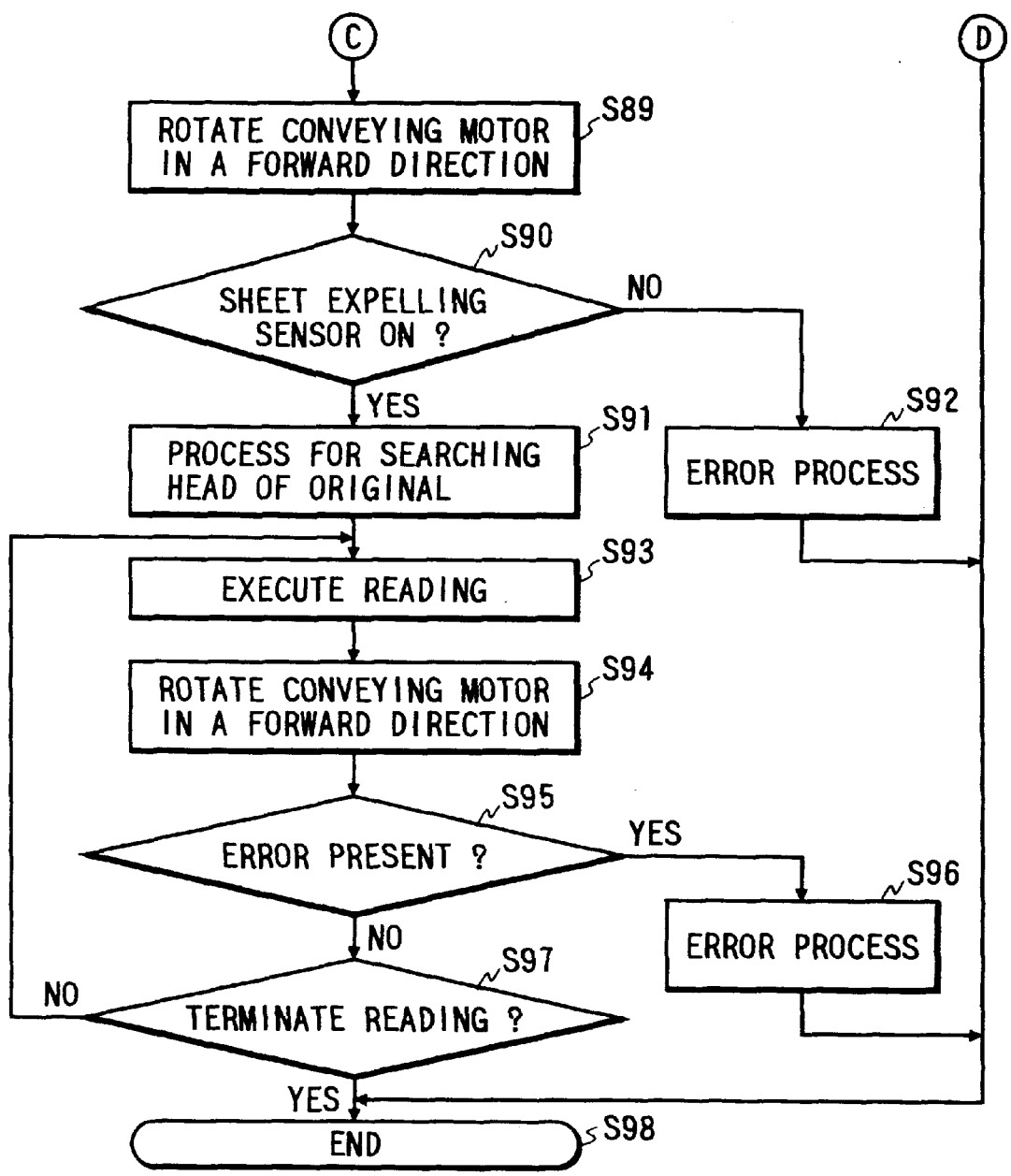

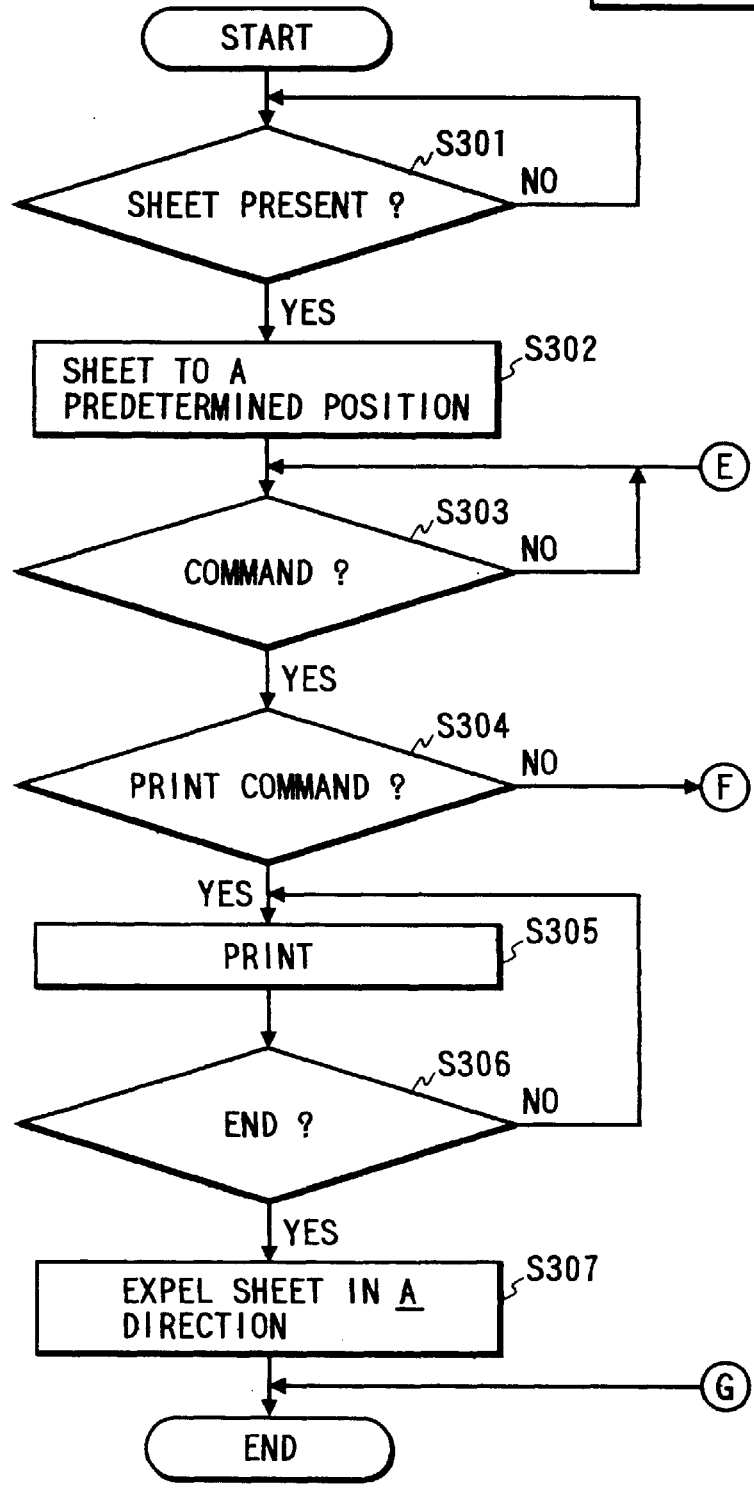

IMAGE READING APPARATUS AND INFORMATION PROCESSING APPARATUS HAVING IMAGE READING FUNCTION

BACKGROUND OF THE INVENTION

1. Field of the Invention

The present invention relates to an image reading apparatus and an information processing apparatus having an image reading function. More particularly, the invention relates to an image reading apparatus and an information processing apparatus, which are provided with means for correcting read-out image signals.

2. Related Background Art

Among recording apparatuses, there has hitherto been the one having a mechanism to read out images on a document (a sheet), which is carried in the same manner as a recording medium, besides a mechanism to record on a recording medium (a sheet). As a recording apparatus provided with such reading function, there is an apparatus that reads a document (a sheet) arranged on a platen using image reading means (an image reading head) mounted on a carriage of the apparatus.

An apparatus of the kind has an advantage that it can be made smaller at lower costs, because images are read by scanning the surface of a document while making the image reading head and a document having such images movable by means of a sheet feeding mechanism and a carriage mechanism adopted for such apparatus. These image reading apparatuses are disclosed in the specifications of Japanese Patent Laid-Open Application No. 59-99860, Japanese Patent Laid-Open Application No. 59-99864, and Japanese Patent Laid-Open Application No. 59-228464, among others, for example. Also, it is disclosed that a white reference reflection plate is provided in a image reading position of a recording apparatus in order to correct the so-called shading distortion, that is, to correct the relationship between the output of reading by an image reading head (means for reading out images), and the black and white condition of a document (reflective densities).

However, for a structure where a white reference reflection plate is provided in the interior of a recording apparatus, the reference reflection plate tends to be stained because the paper and dust particles adhering to a carrier roller or the like are transferred to the reflection plate. Particularly, in a case of an ink jet recording apparatus that records by discharging ink to a recording medium, the white reference reflecting plate is stained by ink mist. As a result, it often becomes difficult for the reference plate to execute its essential function of correcting the shading distortion created by an image reading head.

Here, therefore, a method has been proposed for correcting the shading distortion that may be created by an image reading head, whereby to correct image signals to be output after conversion by use of an image reading head in such a manner that a white reference reflection sheet, which has been prepared separately, is inserted into the sheet carrying path, and the white reference reflection sheet is being carried and read out by the image reading head for the intended correction in the same way as a document to be read, while the white reference reflection sheet is pinched by a carrier roller and a pinch roller on its feeding side (the trailing end side in the carrying direction), and pinched by a pair of sheet expelling rollers or by a pair of a sheet expelling roller and a spur on its expelling side simultaneously.

However, in such method for correcting the shading distortion, ink often adheres to the sheet expelling roller, the spur, or others because these rollers are in contact with a recording medium (a sheet) at the time of recording, and the ink thus adhering to the rollers are transferred to the white reference reflection sheet, thus causing the reflective densities thereof to change (the closer to white, the smaller the value of the reflective density becomes and on the contrary, the closer to black, the greater becomes the value of the reflective density). As a result, the quality of an image to be read may be made inferior. Therefore, in order to remove the cause of such stains that may change the reflective densities it is required to replace the white reference reflection sheets or cleaning the white reference reflection sheet periodically. Furthermore, if a spur is used, there is a possibility that a white reference reflection sheet is damaged by the spur because the contact tips thereof are sharp.

SUMMARY OF THE INVENTION

In consideration of the technical problems involved in the conventional art, the present invention is designed improve means for correcting the converted image signals of image reading means while using such white reference member as described above. It is an object of the invention to provide an image reading apparatus capable of accurately carrying out the correction of converted image signals of reading means without causing the white surface to be stained for a white reference member to be used for correction, and also, to provide an information processing apparatus provided with an image reading function.

It is another object of the invention to provide an image reading apparatus capable of accurately maintaining a correction for a long time without causing the white surface to be stained for a white reference member used for correction when the converted image signals of reading means are corrected by use of the white reference member by guiding it through the same carrying path for the document, and also, to provide an information processing apparatus provided with an image reading function.

It is still another object of the invention to provide an image reading apparatus that includes:

reading means for reading out a document arranged in a reading position for its conversion into image signals;

a reference member;

correction means for correcting the image signals converted by the reading means;

carrying means for guiding the document to the image reading position;

expelling means for expelling the document from the image reading position; and controlling means for controlling and obtaining the corrected data from the correction means by guiding the reference member by use of the carrying means to the image reading position in order to read by use of the reading means the region of the reference member not in contact with the expelling means.

It is a further object of the invention to provide an image processing apparatus capable of selectively mounting thereon reading means for reading a document and recording means for recording on a recording medium, which includes the following:

a reference member;

correction means for correcting image signals converted by the reading means;

expelling means for expelling the recording medium from the image processing apparatus; and controlling means for controlling and obtaining the corrected data from the correction means by reading the region of the reference member not in contact with the expelling means by use of the reading means.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 15 is comprised of FIGS. 15A and 15B showing flowcharts which illustrate a reading process embodying the present invention.

DETAILED DESCRIPTION OF THE PREFERRED EMBODIMENTS (First Embodiment)

Figure 1:
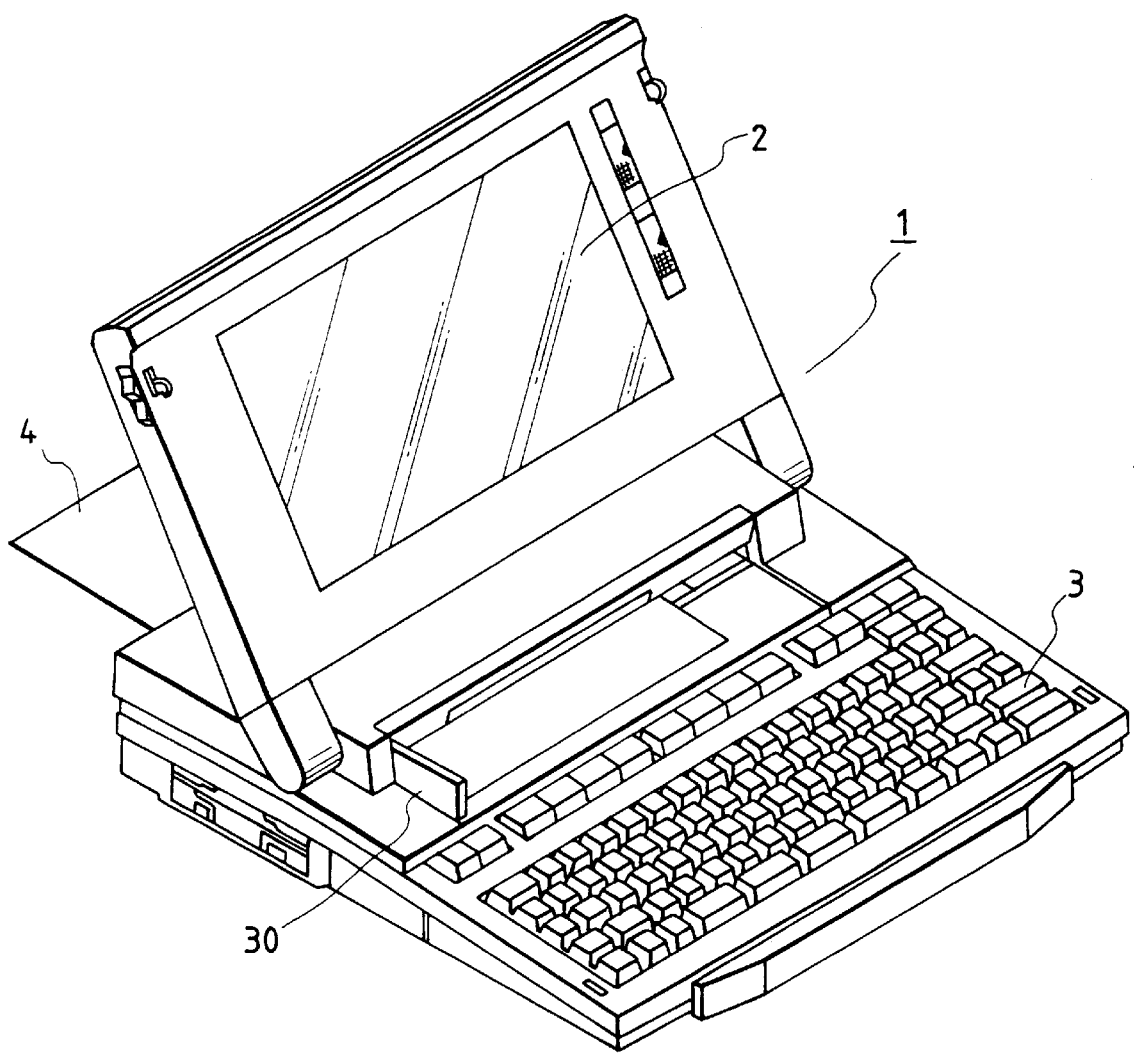
FIG. 1 is a perspective view which shows a wordprocessor embodying the present invention.

Hereinafter, with reference to the accompanying drawings, the description will be made of the embodiments in accordance with the present invention. FIG. 1 is a perspective view which shows a wordprocessor 1 cited as one example of an image reading apparatus and that of an image processing apparatus provided with an image reading function in accordance with the present invention.

In FIG. 1, a reference numeral 2 designates an LCD serving as an indication device; 3, a keyboard serving as an input device; and 4, a sheet member, which is a recording medium such as a recording sheet or a resinous sheet to be used for an apparatus that serves as a recording apparatus, or a document to be used for an apparatus that serves as a reading apparatus, or a white reference reflection sheet 400 to be used for a shading correction by the reading head that corrects converted image signals. Also, a reference numeral 30 designates a left side reference guide for use of a sheet member, which is structured to position a recording sheet, a document, or a white reference reflection sheet in the left and right directions when any one of them is inserted along this guide.

Figure 2:
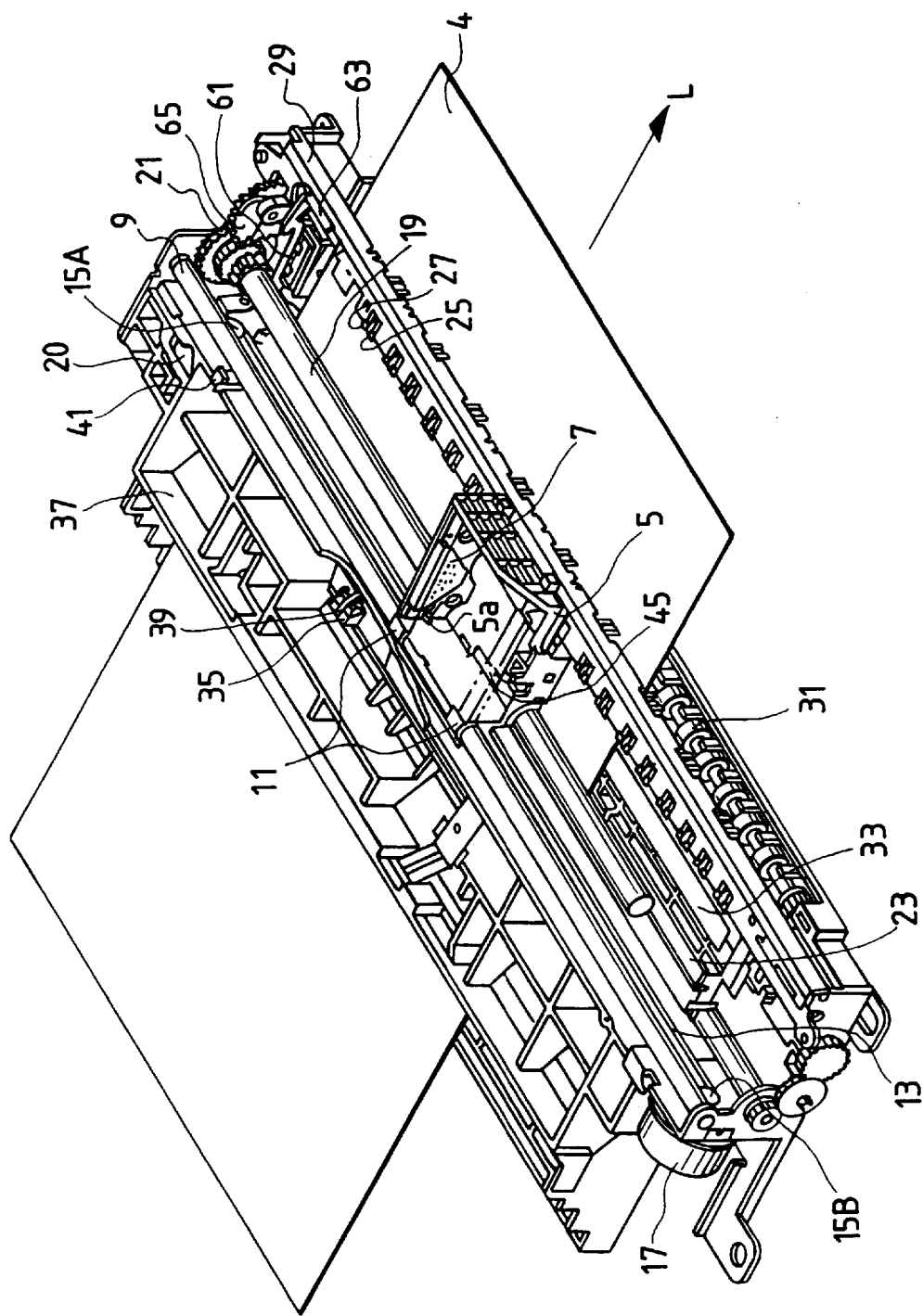
FIG. 2 is a perspective view which shows a head mounting unit embodying the present invention.

FIG. 2 is a perspective view which shows a recording apparatus provided with an image reading function, which is arranged in the wordprocessor described above. In FIG. 2, a reference numeral 5 designates a carriage that travels in the main scanning direction with a recording head 6 or a reading head 200 mounted on it, which will be described later; 7, an electric connector, which is electrically connected with a flexible cable that electrically connects a recording head and a controller on the apparatus main body side, and also, electrically connects the recording head and the controller; 9, a guide shaft for guiding the carriage 5 for scanning, which is inserted through the bearing 11 of the carriage 5; 13, a timing belt that enables the carriage 5 to scan, which is tensioned around pulleys 15A and 15B each arranged on both ends of the apparatus, respectively. Here, one of the pulleys 15B is arranged to transmit the driving force from a carriage motor 17 as required. A reference numeral 19 designates a carrier roller to regulate the recording surface side of a sheet member 4 and to carry it for recording or other operations. The driving force from a sheet feeding motor 20, which is a stepping motor, is transmitted to the LF gear, which is pressed in to one end of the carrier roller through a gear train (not shown). A reference numeral 23 designates a pinch roller arranged in the midway of the carrying path of a recording sheet to press the recording sheet to the carrier roller by means of a pinch roller spring (not shown); 25, a metallic spur rotatively and axially supported by a spur holder 27 and incorporated in a guide rail 29 simultaneously, which regulates the position of the recording surface side of a recording sheet (a sheet member) 4, and to keep a given gap between the ink discharge ports arranged for the recording head and the recording surface of the recording sheet in good precision. In this respect, the reason that the spur is adopted as carrying means on the sheet expelling side for the present embodiment is to minimize the drawback that the sheet member 4 may be stained if the liquid ink discharged onto a recording sheet and the carrying means are in contact with each other before such ink is dried during recording by means of an ink jet method adopted for the present embodiment, and the ink should be allowed to adhere to the carrying means, which is again transferred to the sheet member 4 as it is carried. Here, however, if such arrangement of regulation means is made in a location where ink on the recording sheet 4 is fixed following the performance of an ink jet recording, it may be possible to use a usual roller member.

A reference numeral 31 designates a sheet expelling roller for carrying a sheet member 4 to the expelling outlet (not shown), which is integrally formed by ABS resin and elastomer, and two rollers of the kind are arranged (one of them is not shown) in a location facing the spur through the sheet member 4. At the same time, these rollers are biased by an expelling roller spring (not shown) in the direction of the spur. Also, the expelling roller 31 and the carrier roller 19 are both connected with the sheet feeding motor 20 through a gear train, but the carrying amount per unit of the sheet feeding motor 20, namely, the carrying amount per step, is arranged to be slightly larger for the expelling roller 31 than the carrier roller 19 (for the present embodiment, it is larger by 1.9%). Therefore, an appropriate tension is given at least to the recording region or reading region of a sheet member 4 in a state that the sheet member 4 is positioned between the expelling roller 31 and the carrier roller 19. As a result, it is possible to effectively prevent the sheet member 4 from being bent, and to keep the gap between the recording head 6 and a recording medium serving as a sheet member 4 or the gap between the reading head 200 and a document or a white reference reflection sheet 400 serving as a sheet member 4 in good precision. Hence, a good recording quality and reading precision are obtainable at all times.

Also, a reference numeral 35 designates a sheet sensor serving as detection means using a photo-interrupter. When a sheet member 4 is inserted, the sensor lever 39, which is rotatively and axially supported by an upper guide 37 serving as a guide member at the insertion of a sheet member, is caused to rotate, and the sensor 35 detects the insertion of the sheet member by means of the shielding plate formed as a part of the sensor lever.

A reference numeral 41 designates a home position sensor, which detects the position of the carriage 5 when detecting the passage of the carriage 5.

Also, a cap 61 formed by an elastic material such as rubber covers ink discharge ports 92 arranged for the recording head, which will be described later, thus preventing ink from being dried and solidly fixed. At the same time, while the ink discharge ports 92 being covered, a pump unit 63 is controlled by a cam arranged for a pump gear 65 to obtain a suction force by means of the negative pressure generated in the cap 61. In this way, ink is compulsorily exhausted for the removal of clogging of ink discharge ports 92.

Figure 3A:
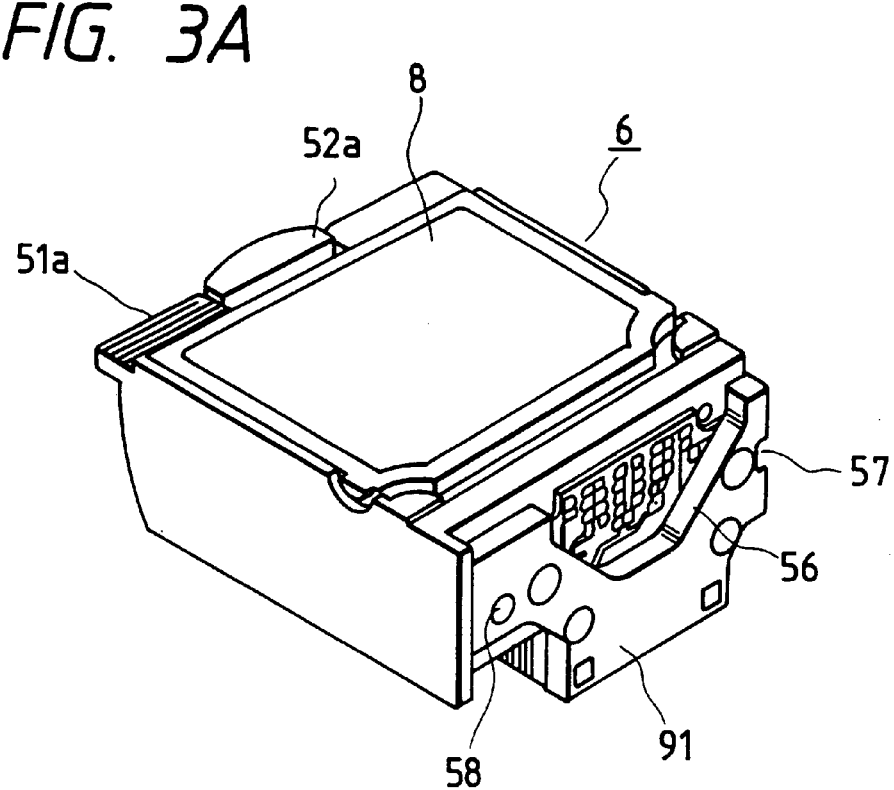
FIGS. 3A and 3B are perspective views which show a recording head embodying the present invention.
Figure 3B:
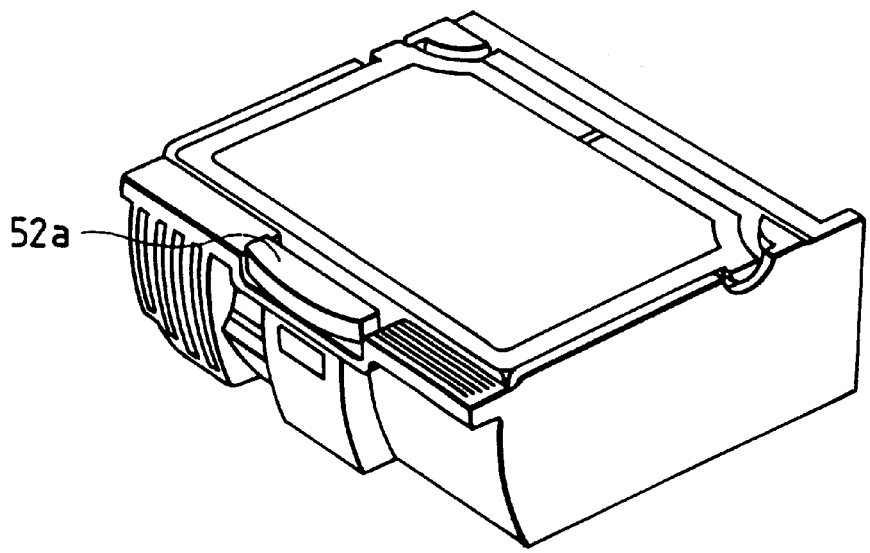

Now, the description will be made of the recording head mountable on the carriage 5 in the recording apparatus. As shown in FIGS. 3A and 3B, an ink tank 8 is detachably mounted on the recording head 6. Therefore, when ink is completely consumed for recording, it can be supplied just by replacing ink tanks 8.

When the apparatus functions as a recording apparatus, the recording head 6 discharges ink downward in accordance with recording signals along the reciprocation of the carriage 5, hence performing ink jet recording on a recording sheet 4.

Figure 4:
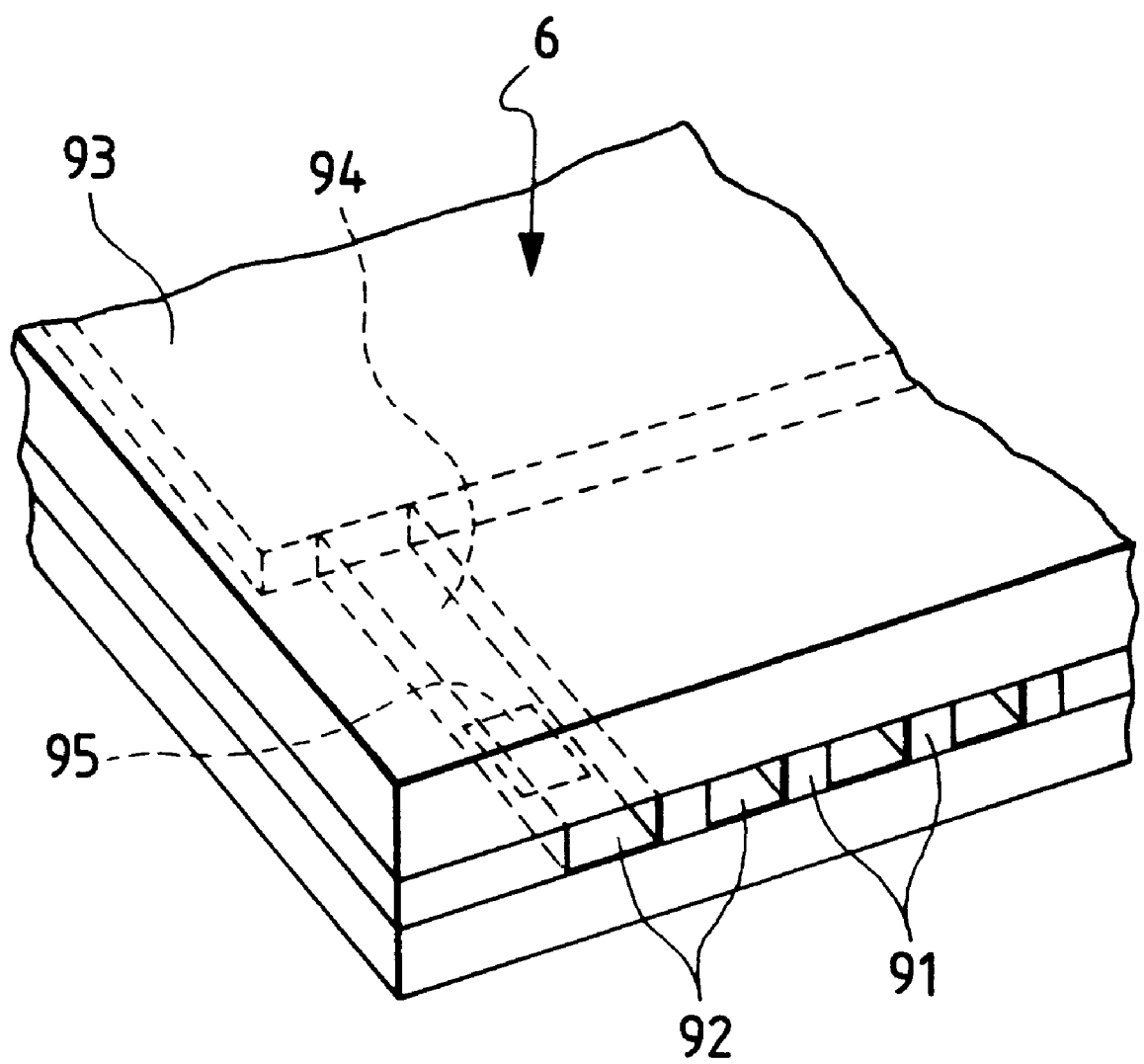
FIG. 4 is a partial perspective view which schematically shows the structure of ink discharging unit of the recording head represented in FIGS. 3A and 3B.

FIG. 4 is a partial perspective view which schematically shows the structure of the ink discharge unit of an ink jet recording head 6. In FIG. 4, on the discharge port surface 91, which faces a sheet member 4 serving as a recording medium (a sheet) with a given gap between them (approximately 0.5 mm to 2.00 mm, for example), a plurality of discharge ports 92 are formed at given pitches, and electrothermal transducing elements (heat generating resistors or the like) 95, which generate ink discharging energy, are arranged along the wall face of each liquid path 94 that connects a common liquid chamber 93 and each of the discharge ports conductively.

The ink jet recording head 6 is mounted on the carriage 5 in such positional relations that the discharge ports 92 are lined in the direction intersecting the scanning (traveling) direction of the carriage 5. Thus, recording means is formed to drive (energize) the electrothermal transducing elements in accordance with image signals or discharge signals in order to create film boiling in ink in each of the liquid paths 94, and to discharge ink from the discharge ports, respectively, by pressure generated at that time.

As other energy generating means that generates an energy of the kind, there are a recording method that uses electromechanical transducing elements, such as piezo elements, a recording method that uses energy generating means wherein the irradiation of electromagnetic wave, such as laser, is utilized for the heat generation thereby to discharge droplets, among some others.

However, of these methods for generating ink discharge energy, the recording head used for the ink jet recording method, in which droplets are discharged by the utilization of thermal energy, makes it possible to arrange liquid discharge ports in a high density for the formation of discharge droplets when discharging recording liquid, and to record in a high resolution. Of these methods, the recording head that uses electro-thermal transducing elements as the source of energy generation makes it easy to produce the head compactly and assemble the system in a higher density at lower costs with the full utilization of the advantages of the IC technologies and micromachining techniques whose advancement and reliability are remarkably enhanced in the semiconductor field in recent years.

Figure 5B:
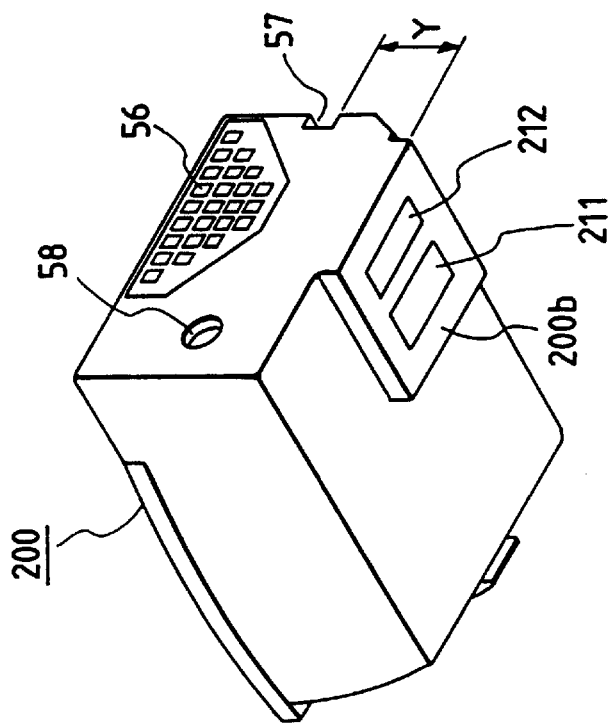
FIGS. 5A and 5B are perspective views which show a scanner head embodying the present invention, and a cross-sectional view thereof, respectively.
Figure 5A:
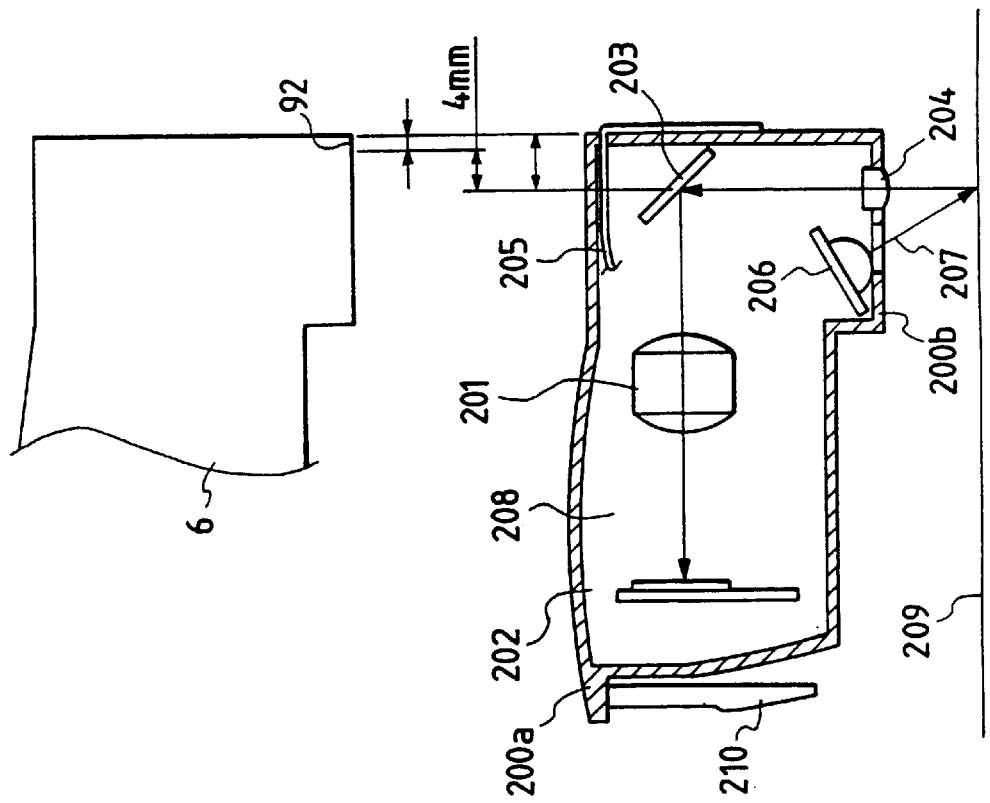

There are two kinds of recording head cartridges serving as the recording unit described above: one is a monochromatic recording head cartridge as shown in FIGS. 3A and 3B and the other is a color recording head cartridge (not shown). These cartridges are usable as needed. Further, when the apparatus is used as a scanner, a scanner head cartridge 200, which serves as a reading unit that can read a document to be inserted as shown in FIGS. 5A and 5B, is also mountable on the carriage 5 of the apparatus. Hereinafter, when these three kinds of the cartridges, that is, the monochromatic recording head cartridge 6, the color recording head, and the scanner head cartridge 200, are collectively referred to, these are simply described as a head cartridge.

Now, the description will be made of the structure wherein the three kinds of head cartridges are detachably mounted on the carriage 5. FIG. 2 is a perspective view which shows such structure without any head cartridge mounted on the carriage 5.

Here, a reference numeral 7 designates a unit arranged on one end of the flexible cable on the carriage 5 side, with which the head terminal unit 56 of each head is in contact when either one of the monochromatic recording head cartridge, the color recording head cartridge, and the scanner head cartridge 200 is mounted. In this way, the head cartridge and the carriage are electrically connected.

On the surface where the cable terminal unit 7 of the carriage 5 is positioned, two extrusions for positioning the head cartridge (one of them is not shown) are integrally formed. In a state that a head cartridge is mounted on the carriage 5, the extrusion 5a for positioning the head cartridge is fitted into a positioning cut off 57 on the head cartridge side, while the other extrusion for positioning the head cartridge is fitted into a positioning hole 58 on the head cartridge side, respectively. Hence, an accurate positioning is possible for the head cartridge with respect to the carriage 5.

Further, in the position where the carriage 5 faces the flexible cable terminal 7, a contact spring (not shown) is provided, and the head guide 45 formed by resin is fixed to the leading end thereof. In other words, the head guide 45 is elastically supported by the carriage 5.

In a state where the head cartridge is mounted on the carriage 5, it is implemented to electrically connect the cable terminal 7 and the head terminal by biasing the head cartridge to the flexible cable terminal 7 side.

Also, the head guide 45 can be bent to allow a head cartridge to be detachably mounted when exchanging cartridges. At the same time, it functions to hold the mounted cartridge not to be displaced upward.

With the structure thus arranged, the user can insert the head cartridge so that its head terminal 56 side faces the cable terminal unit 7 of the carriage 5 when exchanging head cartridges, and then, presses the upper surface of the head cartridge downward so as to bend the head guide 45, thus completing the mounting of the head cartridge as he feels a clicking sense. At this juncture, the electrical connection is also completed.

When removing the head cartridge, the user uses his finger to pull up the head cartridge detachment operation unit 51a, which is provided for the head cartridge, and bends the head guide 45 to remove the head cartridge from the carriage 5.

Now, the description will be made further in detail of the monochromatic recording head cartridge 6 used only for recording in a monochromic color (usually in black). In FIGS. 3A and 3B, the discharge port surface 91 having nozzle unit that discharges ink for recording is formed on the lower face of the monochromatic recording head cartridge serving as recording means. When electric signals are given from a printer unit to the monochromatic recording head cartridge 6 through the head terminal unit 56, ink is discharged downward from each of the discharge ports 92 formed on the discharge port surface 91 as shown in FIGS. 3A and 3B. Recording is executed in this way.

A reference numeral 8 designates a monochromic ink tank. Ink is retained in the interior thereof. The monochromic ink tank 8 is detachably fixed to the monochromic recording head 6 by means of a latch unit 52a integrally and elastically formed with the tank. Also, by means of a detachable joint unit, the monochromic ink tank 8 and the monochromic recording head 6 constitute ink paths.

Therefore, when ink is consumed for recording and no ink remains in the monochromic ink tank 8, it is possible to continue recording by use of a new monochromic ink tank 8 to be mounted after removing the old monochromic ink tank from the monochromic recording head 6 by bending the latch unit 52a.

Now, the description will be made of a color recording head that records in colors, but only in the aspects where it differs from the monochromic recording head. On the discharge port surface 91, four kinds of discharge port groups 92 are arranged individually to discharge four color ink, yellow, magenta, cyan, and black, respectively, in order to execute a color recording.

Therefore, it is arranged to provide two ink tanks for the color recording head: one is a black ink tank for use of the color recording head, which is formed smaller than the black ink tank for use of the monochromatic recording head, and the other is a color ink tank having in it three independent liquid chambers to retain yellow, magenta and cyan ink, respectively. The two ink tanks thus arranged are mountable on the color reading head cartridge together at a time, and via a detachable joint unit (not shown), the tanks are connected respectively with black, yellow, magenta, and cyan nozzle groups formed on the discharge port surface through each of the individual ink paths. In this respect, the outer dimensions of the color recording head and the monochromatic recording head are made substantially the same as readily understandable from the fact that these tanks are exchangeable. As a result, the size of the black ink tank for use of the monochromatic recording head is substantially the same as the overall size of the color and black ink tanks put together for use of the color recording head.

Also, the color and black ink tanks for use of the color recording head are formed to be detachably mountable on the color recording head cartridge by means of latch units provided for each of the tanks as in the case of the monochromatic recording head.

As described above, with the color recording head cartridge being mounted on a printer unit, it becomes possible to record in colors. At the same time, when black ink is completely consumed, only black ink tanks can be exchanged, while only the color ink tanks can be exchanged if either one of yellow, magenta, and cyan ink or all of them are consumed.

Now, FIGS. 5A and 5B are perspective views which show a scanner head 200, and a cross-sectional view which schematically shows it, respectively. In FIGS. 5A and 5B, a reference numeral 206 designates a LED serving as illuminating means, which is used for means for illuminating the surface of a document 209. Light 207 emitted from the LED 206 illuminates the surface of the document 209 through the aperture 211 arranged for the LED. Imaging light 208 from the surface of the document 209 passes a field lens 204 formed for a sensor aperture 212. The optical path thereof is bent at 90 degrees by means of a mirror 203, thus forming an image on an optical sensor 202 after passing a focus lens 201.

In accordance with the present embodiment, the center of the sensor aperture 212 is formed to shift approximately 4 mm from the center of the ink discharge ports of a monochromic recording head 6 or a color recording head.

The LED 206 and the sensor 202 are externally drawn by means of a wiring 205, and connected with the head terminal unit 56 electrically. For the head terminal unit 56, electrodes are formed to be in contact with the electrodes of the carriage 5 under pressure. Signals are thus conducted to the controller on the main body side.

The external shape of the scanner head 200 is substantially the same as the external shape of the recording head 6 provided with an ink tank 8 mounted on it. In the same manner as the recording head 6, it is possible to mount the scanner head on the carriage 5 by use of the latch of a nail 210 that forms a part of the external configuration of the scanner. Also, when removing it, the operation unit 200a for detecting a head cartridge is pulled up to release the engagement of the latch of the nail 210. The scanner is then easily removed.

Now, in conjunction with a block diagram showing an electric circuit, and with a software flowchart as well, the description will be made of the various aspects regarding the recording operation in accordance with a mode of the present embodiment.

Figure 6:
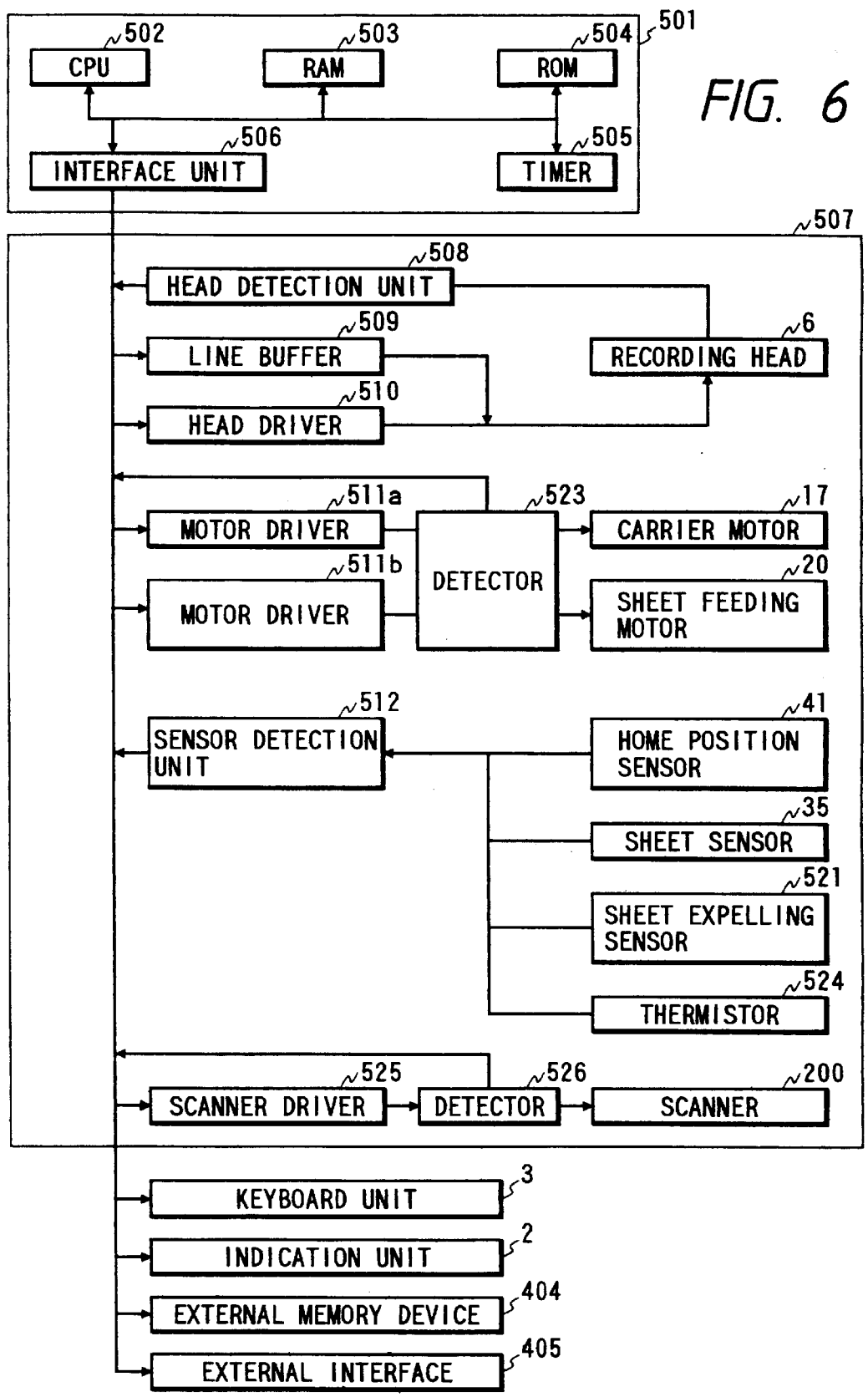
FIG. 6 is a block diagram which shows the structure of a wordprocessor embodying the present invention.

FIG. 6 is a block diagram showing the structure of an electric circuit for a wordprocessor in accordance with the present embodiment. In FIG. 6, a reference numeral 501 designates a controller that deals with the major control of the system; 502, a CPU serving as controlling means in the mode of a microcomputer, for example, which executes processes in accordance with certain procedures; 503, a RAM provided with an area where text data and image data are developed, and also, with a working area and the like; 504, a ROM storing a program that executes operations following the aforesaid procedures, and also, prearranged data such as those on fonts or the like; 505, a timer that generates an execution cycle of the CPU 502 or creates the timing required for executing a recording operation by means of a printer unit; 506, an interface unit to exchange signals between the CPU 502 and peripheral devices.

Also, a reference numeral 507 designates a controller of the printer unit; 508, a head detector that detects information regarding the recording head, such as the output values of a sensor that indicates the presence and absence, the kinds, and the temperature of the recording head 6, and the output values of a sensor that indicates the presence and absence of ink in the ink tank 8; 509, a line buffer storing recording data for the recording head 6; 510, a head driver that provides the recording head 6 with recording signals, electric power, and others; 511a and 511b, motor drivers that provide a carriage motor 17 and a sheet feeding motor 20 with required signals and electric power, respectively; and 512, a sensor detection unit that detects outputs from a home position sensor 41, a sheet sensor 35, and sheet expelling sensor 512, and others.

Further, a reference numeral 404 designates an external memory device such as a FDD or a RAM card, among some others; and 405, an external interface for communicating with other information apparatuses or controlling the peripheral devices when connected directly with the inner bus. In this respect, although not included in the block diagram shown in FIG. 6, a power-supply is arranged to supply electric power to the electric circuit described above.

Now, the brief description will be made of the fundamental operation to use a reading function. For the detailed control thereof, the description will be made in accordance with a flowchart later.

At first, the scanner mode is selected on a menu screen, and the scanner head 200 is mounted on the carriage 5. Then, the CPU 502 serving as mode switching means reads signals from the printed-circuit board, which identifies the recording head cartridge or the scanner head cartridge, and enters the scanner mode (that is, the image reading mode).

The CPU 502 handles the menu for reading operation, which will be described later, when receiving scanner reading signals are received from the application currently in use, the keyboard unit 3, the external interface 405, or the like, and drives the sheet feeing motor 20 to carry a reading document to a given position if the document is manually inserted as in the case of a recording sheet. Then, after the LED 206 is turned on, the CPU reads image signals through the scanner driver 513 while driving the carriage motor 17.

Here, the driving speed of the carriage motor 17 can change depending on document reading modes set for the scanner head 200. Such modes are a combination of the reading resolution and the gradation of each of the reading values. Here, the output of the sensor 202 of the scanner head 200 is 360 dpi in the main scanning direction and 360 dpi in the sub-scanning direction. Therefore, not only it is possible to perform reading in a gradation of 64, but also, to perform reading in a gradation of 2 with 90 dpi in the main scanning direction and 90 dpi in the sub-scanning direction. In addition, there is a mode that provides reading in a resolution of 200 dpi in the main scanning direction, which is designed in consideration of the adjustment with a FAX operation.

Here, it takes a considerable time to execute the data process and transfer for a mode of reading in a gradation of 64 with 360 dpi in the main scanning direction and 360 dpi in the sub-scanning direction, simply because this mode requires a great amount of data for the implementation thereof. Therefore, the carriage driving speed is made slower. Here, for the mode that provides reading in a gradation of 2 with 90 dpi in the main scanning direction and 90 dpi in the sub-scanning direction, the carriage driving speed is made faster. When a one-line reading is completed, a one-line portion is fed by use of the sheet feeding motor 20. Then, the next line is read. Such operation is continuously performed until a document is completely read.

Figure 7:
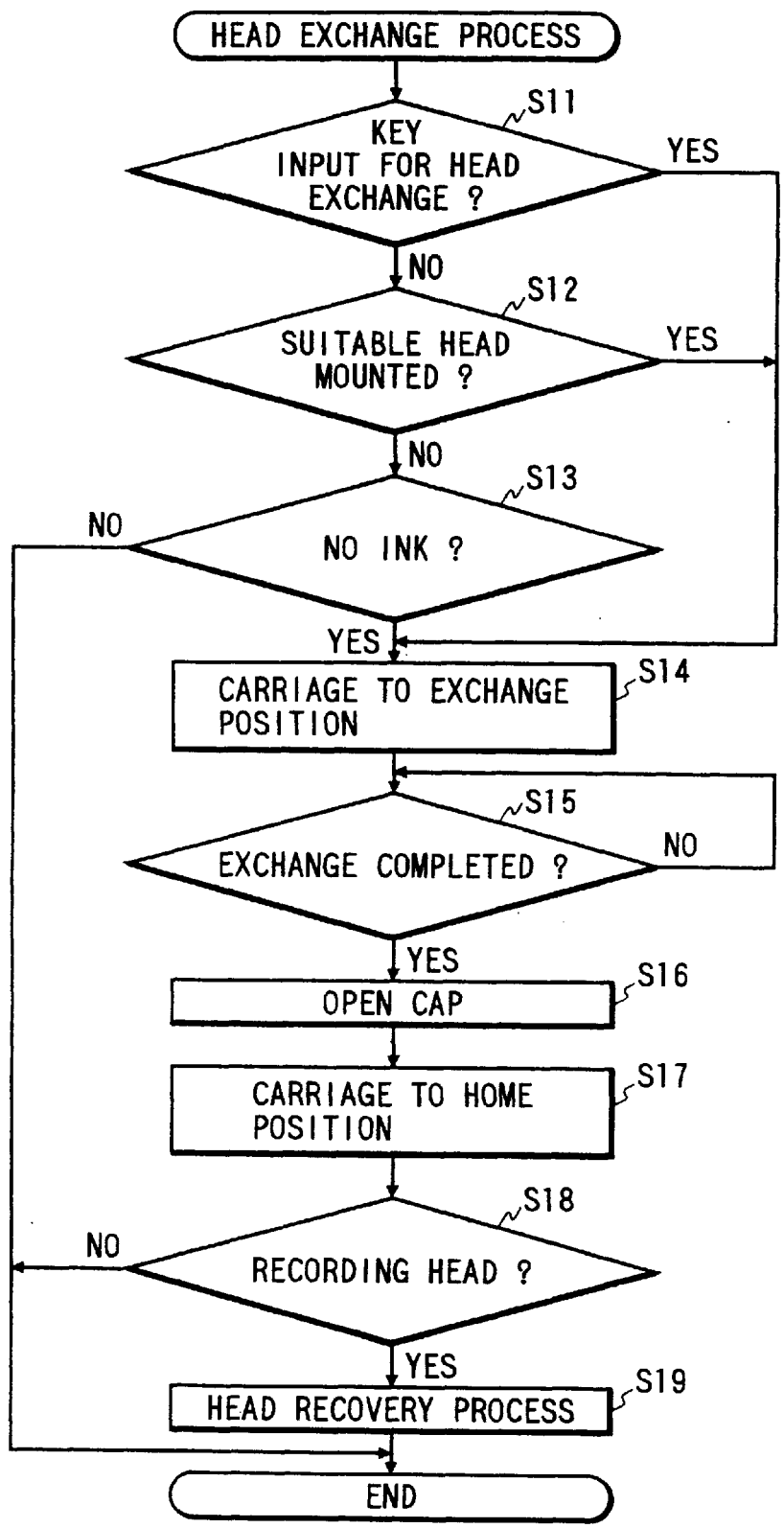
FIG. 7 is a flowchart which shows the head exchanging process embodying the present invention.

Now, in conjunction with a flowchart shown in FIG. 7, the description will be made of the outline of the control sequences of the recording operation and others. FIG. 7 is a flowchart which shows the control needed for exchanging recording head 6, ink tanks 8, or scanner heads (reading heads) 200.

In step S11, it is determined whether or not there is any input of interruption from the keyboard for exchanging recording head 6, ink tanks 8, or scanner head 200. Then, in step S12, it is examined if any head that does not conform to the current menu selection is mounted. Further, in step S13, it is determined whether or not ink still remains in the ink tank currently in use. If any request for such exchange is made in the step S11 or any improper head is found to be mounted in the step S12 or ink is found to be short in the step S13, the carriage motor 17 is driven in step S14 to shift the carriage 5 to the predetermined position for the execution of such exchange. Then, if it is confirmed in step S15 that the intended exchange has been completed, the carriage is retracted to release the capping of a cap 61 in step S16. In step S17, the carriage 5 is returned to the home position. Thus, in continuation, in step S18, the device mounted on the carriage 5 is detected, and if it is found to be a recording head 6, the process proceeds to step S19. In the step S19, ink is sucked from the ink discharge ports 92 of the recording head 6 by use of the pump unit 63. When recording heads 6 or ink tanks 8 are exchanged, it is possible to suck out from the recording head 6 any fine obstacles, such as air and dust particles, that may be intermingled with ink in each of the ink paths and may cause the defective discharges from the recording head 6 or defective supply from the ink tank 8. With this process, therefore, it is made possible to prevent occurrence of defective discharges.

Figure 8:
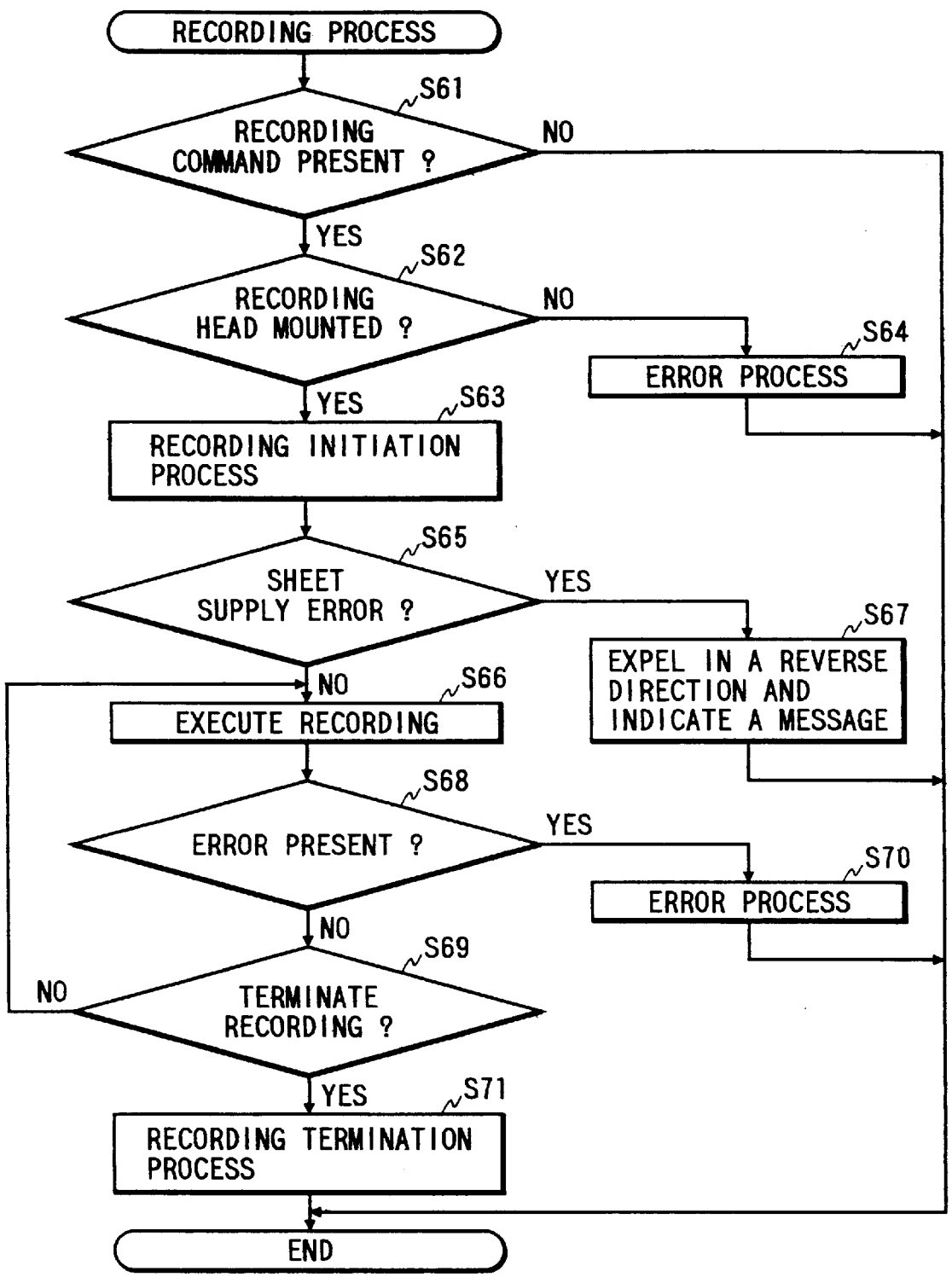
FIG. 8 is a flowchart which shows the recording process embodying the present invention.

Now, FIG. 8 is a flowchart which illustrates the recording process. At first, in step S61, it is examined whether or not there are any commands regarding the execution of a recording, such as a sheet feeding command, the presence or absence of reception of data to be recorded. If any command on recording is found, the process proceeds to step S62. If not, the current process terminates. In the step S62, the CPU 502 serving as detection means examines whether or not a recording head 6 is mounted on the carriage 5. If affirmative, the process proceeds to step S63. If negative, it proceeds to step S64.

In the step S64, the CPU 502 serving as warning means issues a warning by indicating an error message on the indication device or sounding a buzzer. In the step S63, a process is executed to start recording. More specifically, a temperature adjustment is executed for the recording head 6 by means of a heater in the recording head 6; a discharging adjustment is executed for the recording head 6 by causing it to discharge ink outside the recording region; and a gap correction is executed for a bidirectional recording by means of the home position sensor that detects the amount of lag for the carriage motor 17 at the time of making its forward and backward scans.

Then, the process proceeds to step S65, the feeding condition of a recording sheet is examined. If any insertion of a recording sheet is detected by the sheet sensor 41, the sheet feeding motor 20 is driven after a wait of two seconds in the regular direction until the leading end of the recording sheet arrives at the sheet expelling sensor 521. Then, when the sheet expelling sensor confirms the arrival of the leading end of the recording sheet, the process proceeds to step S66 to prepare for the next recording operation. On the other hand, if no insertion of recording sheet is detected, it is interpreted that the insertion is defective, and the process proceeds to step S67 to expel the recording sheet in the reversed direction, that is, toward the insertion side, and to indicate an error message.

In the step S66, a recording is executed per given unit. More specifically, the sheet feeding motor 20 is driven for a given amount of driving in the forward direction, thus producing the upper edge margin of the recording sheet in accordance with a set value. Then, in continuation, the carriage motor 17 is driven to record by discharging ink from the recording head 6. When recording for a given number of lines is completed, the sheet is carried for a given length. Thus, the process proceeds to step S68 to examine whether or not any errors are committed. If affirmative, the process proceeds to step S70. If negative, it proceeds to step S69. The examination of errors is carried out by detecting the lower edge of a sheet, the presence of sheet jamming, the presence and absence of ink, and scanning errors of each of the motors, among some others, for example. In accordance with the contents of errors detected, the warning messages are shown on the indication device or the like accordingly. In the step S69, it is examined whether or not any command is issued to terminate recording, such as the reception of sheet expelling command. If affirmative, the process proceeds to step S71. If negative, the process returns to the step S66 to continue recording. In the step S71, the process to terminate recording is executed. More specifically, the recording sheet is expelled in the forward direction, and a capping is operated to cover the ink discharge ports 92 of the recording head 6 by use of a cap 61, besides among some other routines, and then, the current process terminates.

Now, as an image reading correction in a mode of the present embodiment, the description will be made of the black and white reference corrections using the CPU 502 serving as correction means.

In accordance with the present embodiment, the reading head is positioned on the platen in the vicinity of the home position for the execution of a black reference correction. Then, in a state that the LED is turned off, the correction is made by reading the color of platen, which is formed by resin in black.

On the other hand, the user inserts a white reference sheet 400, which is a standard member dedicated to this correction, to execute a white reference correction. Then, by reading the reflective density from this member, the correction is made. Here, in accordance with the present embodiment, the white reference sheet 400 is formed by a white PET having a high light shielding capability with a reflective density of 0.05. It is a square sheet whose thickness is 0.1 mm and size is 148 mm at one side.

Figure 9:
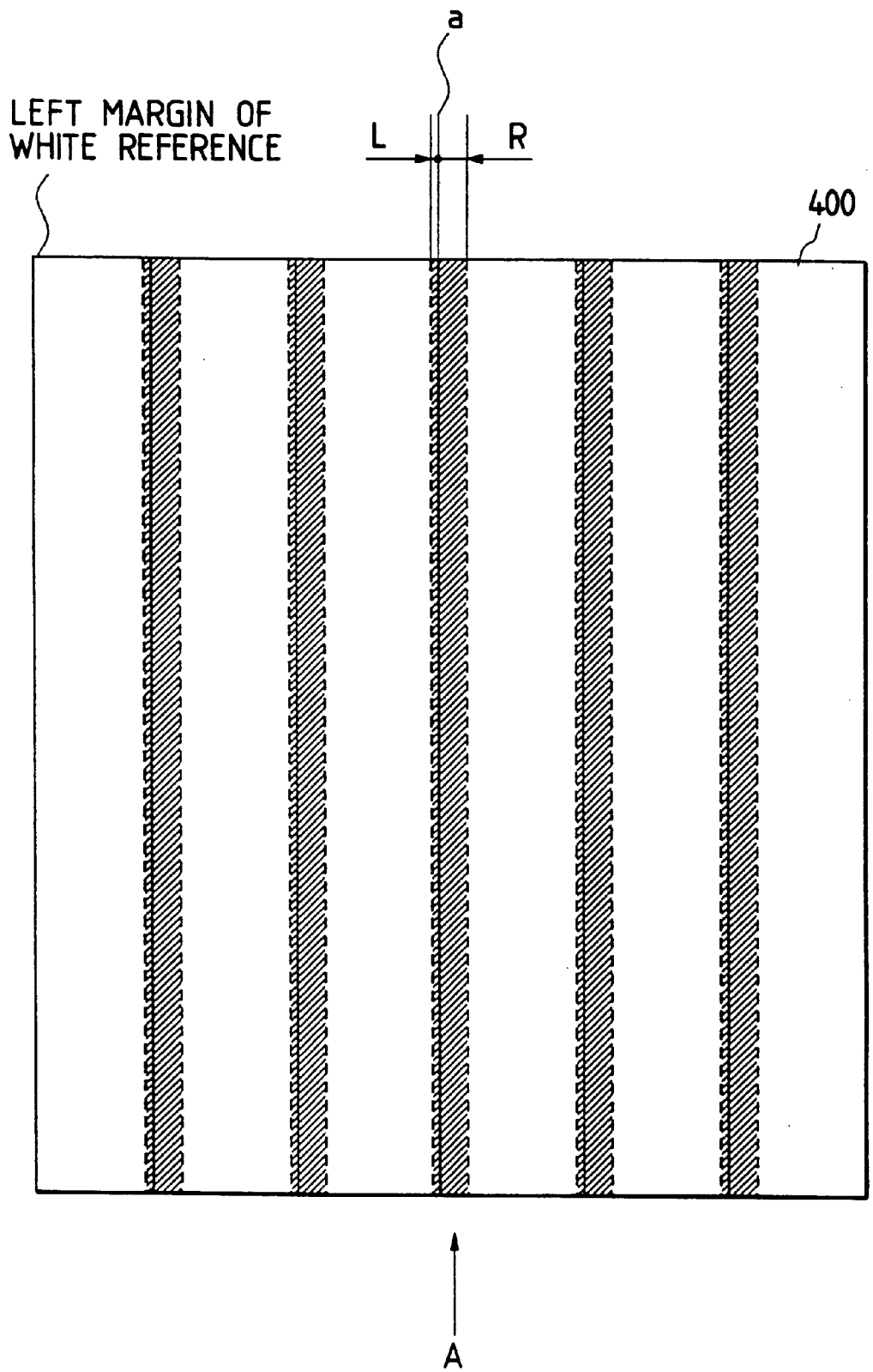
FIG. 9 is a view which shows the relationship between the spur position and the reading position of a white reference sheet embodying the present invention.
Figure 10:
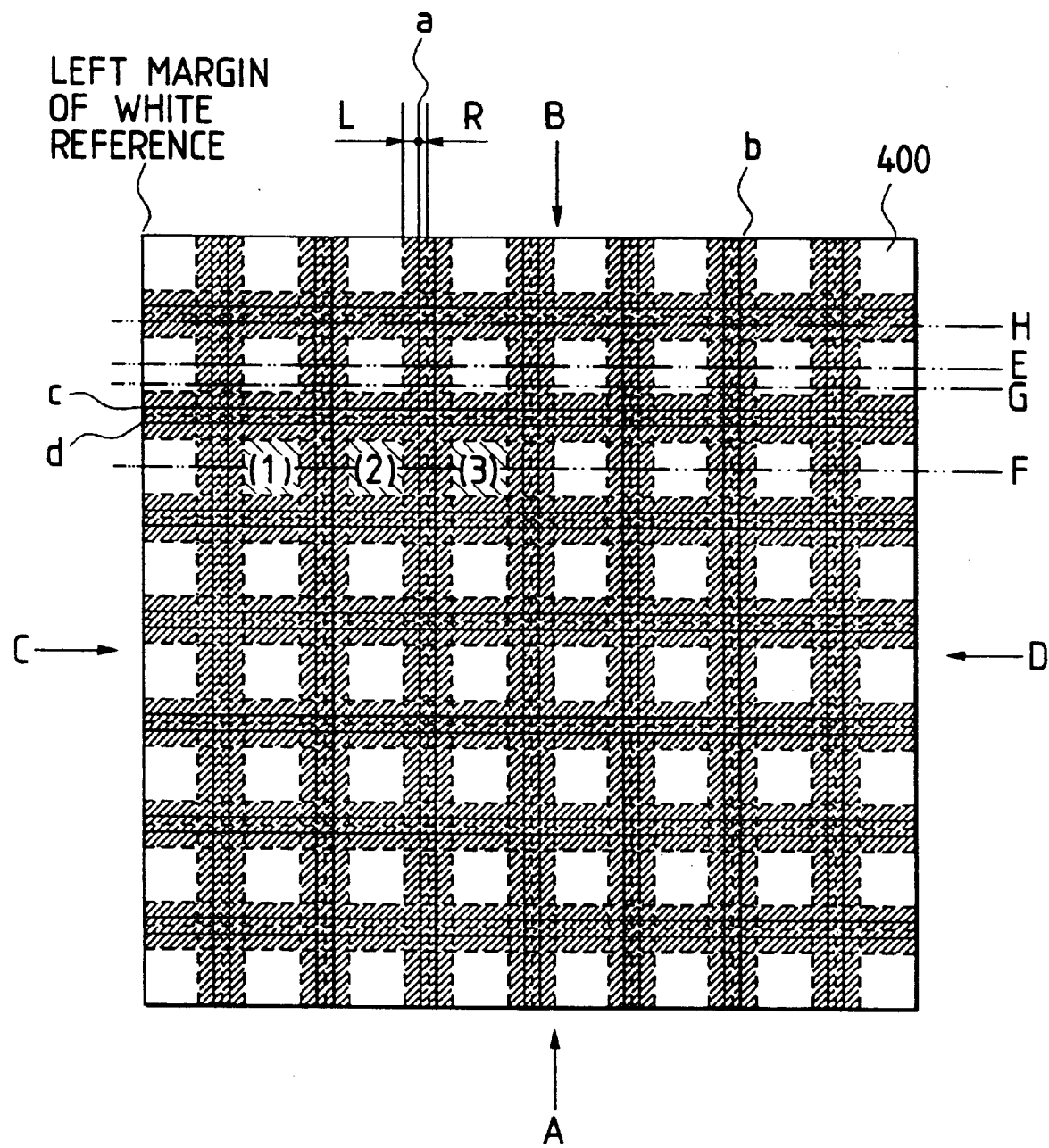
FIG. 10 is a view which shows the relationship between the spur position and the reading position of a white reference sheet embodying the present invention.

Now, FIG. 9 and FIG. 10 are views showing the relations between the positions of the spurs 25 and the reading positions of the white reference sheet 400. In FIG. 9, each straight line a indicates the position where the white reference sheet 400 and the spurs 25 abut upon each other when the white reference sheet 400 is inserted and carried in the direction A along the left reference guide 30. Also, along each of the lines, there are provided regions indicated by hatching in a width L on the left side and a width R on the right side, respectively. These are the error ranges provided in consideration of the possible amount in which the left edge of the white reference sheet 400 may be inserted away from the left reference guide 300 or of the amount of gap or the like that may be brought about by dimensional tolerances of the respective parts when the white reference sheet 400 is inserted. In other words, these are the regions where the spurs 25 may abut upon the white reference sheet.

Here, the reason why the width L becomes greater than the width R is that the sheet guide 30, which is provided for the recording unit of the wordprocessor in the mode of the present embodiment, is arranged only for the left side for the provision of such referential guide, but not for the right side at all.

Also, if there is no directionality required for the insertion of the white reference sheet 400 as shown in FIG. 10, the inserted image correction reference sheet can face on in four directions as indicated by arrows A to D. Therefore, the regions in which the spurs 25 may abut upon the sheet (those indicated by hatching) are more increased, and the regions usable for the image correction reference (those blank regions in FIG. 10) are decreased accordingly.

Figure 11B:
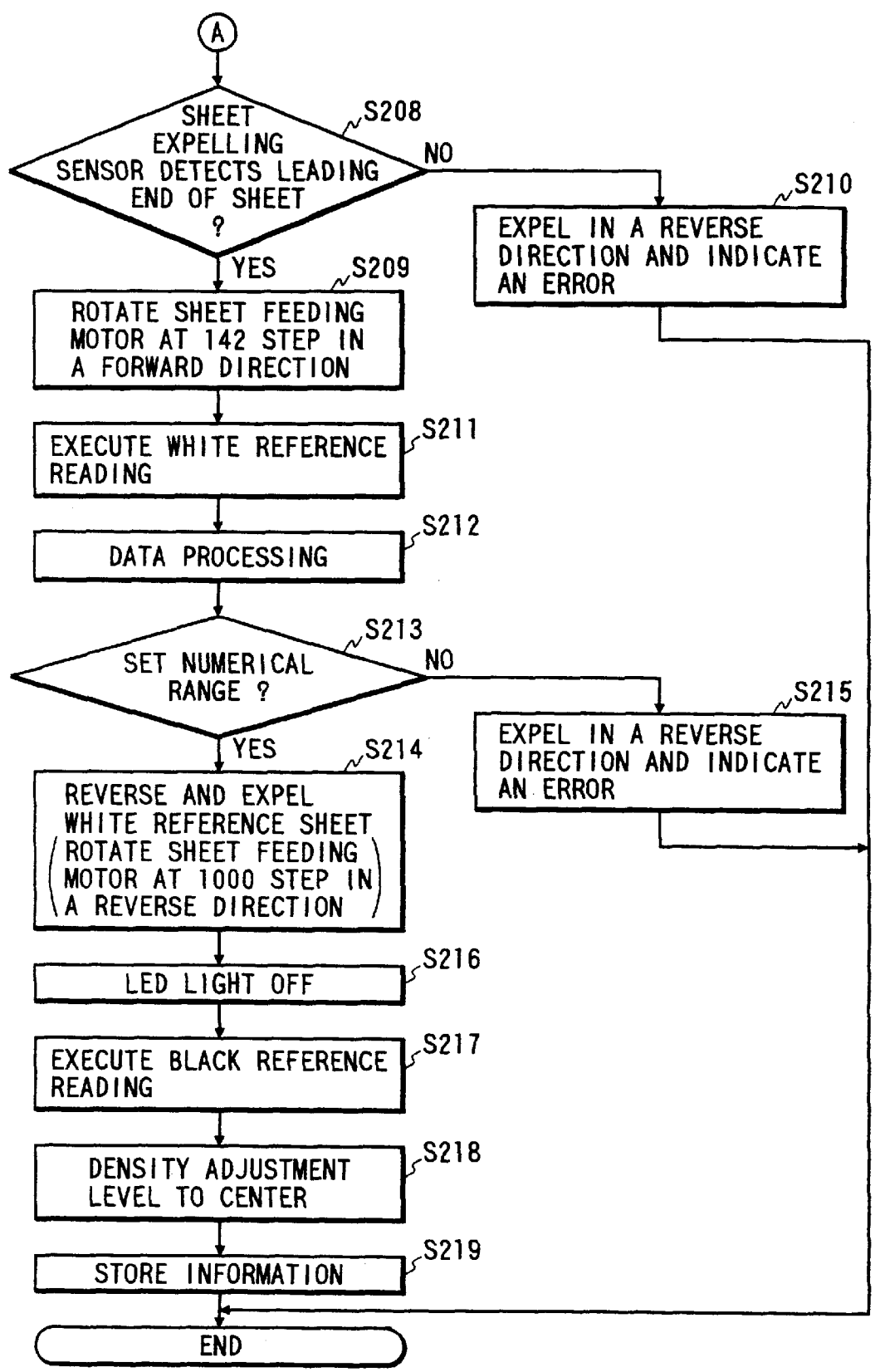
FIG. 11 is comprised of FIGS. 11A and 11B showing flowcharts which illustrate the correction processes of black and white references embodying the present invention.

FIGS. 11A and 11B are flowcharts showing the black and white reference correction processes with the white reference sheet 400 being is inserted in the direction A in FIG. 10. At first, in step S201, a message that requests the selection of the white reference correction mode appears on the indication device to prompt the use to "correct white reference to obtain the optimum result of reading", for example. Then, in step S202 the process proceeds to step S203 where the LED is turned on for 30 seconds in order to raise the scanner temperature to substantially the same temperature at which a document is read. At the same time, in step S203 it is waited till the white reference sheet 400 is inserted. When the leading end of the white reference sheet 400 abuts upon the position at (1) in FIG. 12, which is a side view schematically showing this structure, and then, the insertion is detected by the sheet sensor 35, in step S204 a wait of two seconds is given after the detection by the sheet sensor 35 and then in step S205, the motor is driven only for 142 steps to carry the white reference sheet 400 until its leading end arrives at the position at (2) in FIG. 12. When the reading execution command is inputted by a key in step S206, the sheet feeding motor 20 is driven in the forward direction for 498 steps so as to enable the leading end of the white reference sheet 400 to reach the sheet expelling sensor 521 assuredly. Then, the white reference sheet 400 is carried until the leading end thereof gets to the position at (3) in FIG. 12. At this juncture, even if the position E shown in FIG. 10 should arrive at the central position of the array of 128 reading elements provided for the scanner, it is not necessarily regarded that the leading end of the white reference sheet 400 has reached the sheet expelling sensor 521. However, with the position F on the sheet 400 having arrived at the central position of the array of the reading elements, it can be considered that the leading end of the white reference sheet 400 has reached the sheet expelling sensor 521 assuredly even if the tolerances of parts and others are taken into account. Therefore, in step S208, when the sheet expelling sensor 521 confirms the arrival of the leading end of the white reference sheet 400, the process proceeds to step S209. On the other hand, if the arrival thereof is not confirmed, it is interpreted that the insertion of the white reference sheet 400 is defective, and the process proceeds to step S210 to expel the white reference sheet 400 reversely and to indicate an error message simultaneously.

Figure 14:
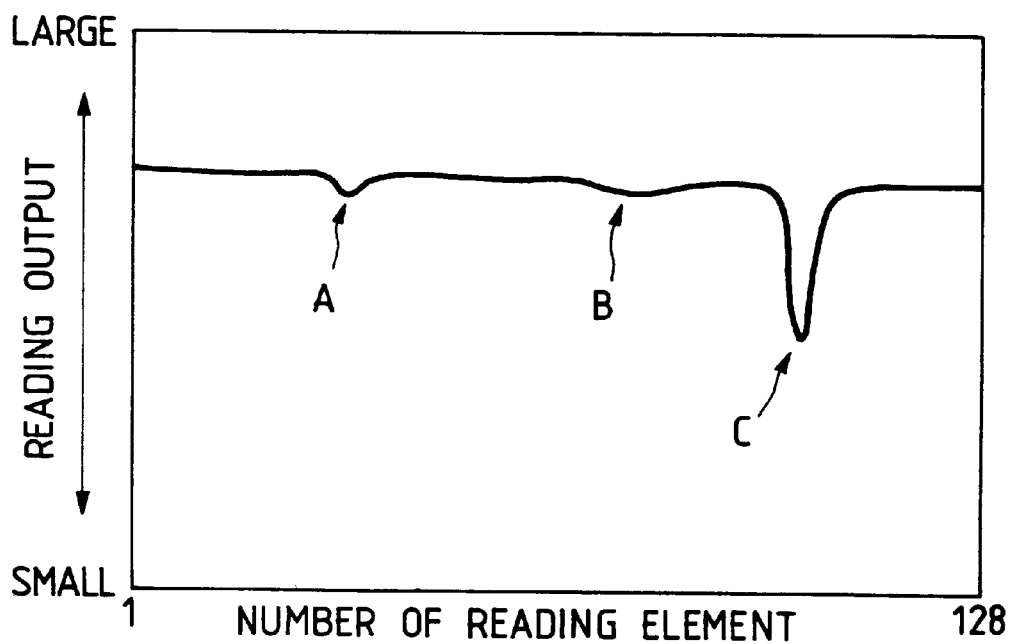
FIG. 14 is a view which shows another example of the result of a reading output embodying the present invention.

In the step S209, the motor is further driven for 142 steps in the forwarding direction to carry the white reference sheet 400 until the leading end thereof gets to the position at (4) in FIG. 14 so that the regions (1), (2) and (3) shown in FIG. 10 are placed in the scanning portion of the reading elements of the reading head 200.

Here, at the same time that the leading end of the white reference sheet 400 has arrived at the sheet expelling sensor 521 assuredly, the white reference sheet 400 is held by the two expelling rollers 31 reliably, because one of the sheet expelling rollers 31 is positioned at G in FIG. 10 on the upstream side in the carrying direction, while the other one of them is portioned at H in the downstream side in FIG. 10. Thus, the gap between the head and sheet is maintained in good precision. Therefore, in step S211, the intended reading is executed for the white reference sheet 400 in the three regions at (1), (2), and (3) in FIG. 10. Here, the length of one side of the regions (1), (2), and (3) is sufficiently greater than the length of the array of reading elements arranged for the scanner 200. In this respect, if the direction of insertion of the white reference sheet 400 is limited, it should be good enough if only the regions where any abutting may take place are evaded in the limited direction. In such a case, the regional arrangement is not necessarily confined to the one provided for the present embodiment. Such mode of this embodiment will be described later in detail.

Figure 13:
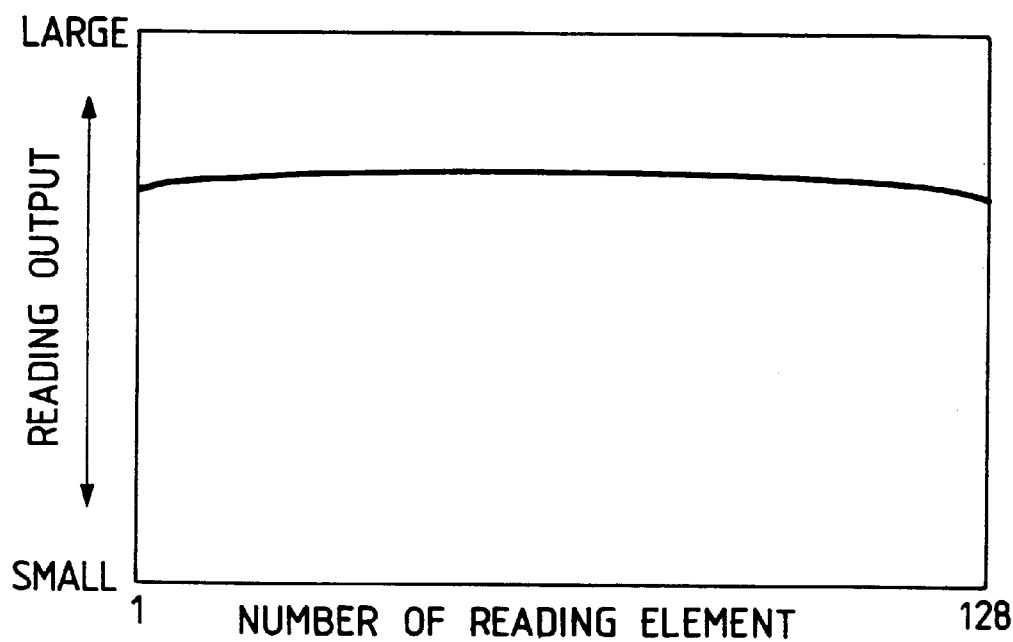
FIG. 13 is a view which shows one example of the result of a reading output embodying the present invention.

In step S211, the reading is executed 100 times each for the three regions, respectively. In other words, a total of 300 data is accumulated per element. In this respect, FIG. 13 illustrates one example of the result of white reference reading obtainable by one-time reading. In FIG. 13, the axis of ordinate indicates each number of 128 reading elements arranged for the scanner on one straight line on the scanner in the sheet carrying direction, and the axis of abscissa indicates the reading outputs. Here, a structure is arranged so that the reading outputs indicate greater values if the reflective densities are made lower. In contrast, FIG. 14 illustrates the reading result of the white reference sheet 400 without any application of the present invention. The outputs become lowered at three positions indicated by arrows A, B, and C. This is because ink adhering to the spurs is transferred to the white reference sheet, thus making the reflective densities higher locally.

Therefore, in the next step S212, a data process is executed to minimize errors that may be caused by dust particles and ink adhering to the white reference sheet 400, and by repeated reading as well. Here, in accordance with the mode of the present embodiment, the data process is executed using the average value of 100 data having the smaller values of the reflective densities among the 300 data accumulated per element as the value of the white reference. The reason why only data having the larger values are cut off is that as clear from FIG. 14, the substances such as dust particles, which cause the original reflective densities to change when adhering to the white reference sheet 400, are only those having the higher reflective densities than the white reference sheet 400, and not any other substances, because the white reference sheet 400 is formed by a material having a sufficiently high whiteness itself. Nevertheless, this process is not necessarily confined to the one having the contents described above. For example, it should be possible to execute the process using the average value of the 51st to 150th data counting from the reflective density on the lower side if the white reference sheet 400 to be used is gray, not sufficiently white as in the mode of the present embodiment.

Thus, in the next step S217, a comparison is made to ascertain whether or not the data after the aforesaid process are within the predetermined range of values. This step is needed to give warning to the user if the inserted white reference sheet 400 is different from the sheet recommended as the optimum one for making correction or the white reference sheet is stained to a considerable extent. Here, for the maintenance of the predetermined values described above, it is desirable to store and hold the optimized data per scanner head 200 after difference in characteristics is taken into account per scanner head 200. If the result of the comparison is found to be within the values described above, the sheet feeding motor is reversed at 1000 step and the white reference sheet 400 is reversely expelled in step S214. Then, the precess proceeds to the next step where the level of white reference is completely set. On the other hand, if the result is found to be outside such values, it is interpreted as errors and the white reference sheet 400 is reversely expelled. Then, the indication of an error message, such as "The white reference sheet is stained. Clean it and resume the execution" is given in step S215.

Subsequently, in step S216 and step S217, the black reference correction is executed. In the step S216, the LED is turned off, and then, in the step S217, the black reference correction is executed in such state after the carriage is returned to the home position in the same manner as to process the white reference correction including the data processing described above. In step S218, the density adjustment is performed, and in step S219, data are stored, thus terminating this process.

Now, in conjunction with FIGS. 15A and 15B, the operation of document reading will be described. At first, in step S81, it is examined whether or not there is any command for reading, such as to check the presence and absence of the command to start reading. If affirmative, the process proceeds to step S82. If negative, the process terminates. In the step S81, it is examined whether or not the scanner head 200 is mounted on the carriage 5. If affirmative, the process proceeds to step S83. If negative, it proceeds to step S84.

In the step S84, an error message is shown on the indication device or a buzzer is sounded to warn the user accordingly. In the step S83, the LED in the scanner head 200 is turned on for 30 seconds as a reprocess for the scanner head to begin its reading operation, thus raising the temperature to the one required for the scanner head to arrive at in order to execute a stabilized reading. Moreover, by stabilizing the temperature, it becomes possible to minimize characteristic changes that may caused the temperature variation. Then, continuously, in step S85, the amount of gap is measured for the forward and backward scanning by the carriage motor 17 by use of the home position sensor, hence performing the gap correction for a bidirectional recording as a reprocess to prepare the carriage to travel.

Then, the process proceeds to step S86 where the sheet feeding is checked. If the insertion of a document is detected by the sheet sensor 35, a wait is given for two seconds in step S88. After that, in step S89, the sheet feeding motor 20 is driven in the forward direction for a sufficient amount so that the leading end of the document arrives at the sheet expelling sensor 521. In step S90, if the sheet expelling sensor is turned on, the process proceeds to step S91. If it is still turned off, the process proceeds to step S92 to indicate an error message. Then, in the step S91, the sheet feeding motor is reversely driven to return a recording sheet, and in continuation, the motor is regularly driven to set the upper margin of the recording sheet at a predetermined value. Subsequently, the process proceeds to step S93 to read given lines. More specifically, the carriage motor 17 is driven to enable the scanner head 200 to read, and when given lines are read, the sheet is fed for a given amount in step S94, and the process proceeds to step S95. In the step S95, an error check is made. If there is any error, the process proceeds to step S96. If not it proceeds to step S97.

The contents of the error check are such as to detect the lower edge of the sheet, to detect the presence of any sheet jamming, to detect scanning errors of each motor, among some others. In the step S97, it is examined whether or not there is any command indicating the termination of reading. For example, the reception of sheet expelling command is examined. If there is no command found to indicate the termination of reading, the process returns to the step S93 to continue reading. Lastly, in step S98, the sheet is expelled, the scanner head is returned to the home position, among others, and then, the reading process terminates.

(Second Embodiment)

Figure 16:
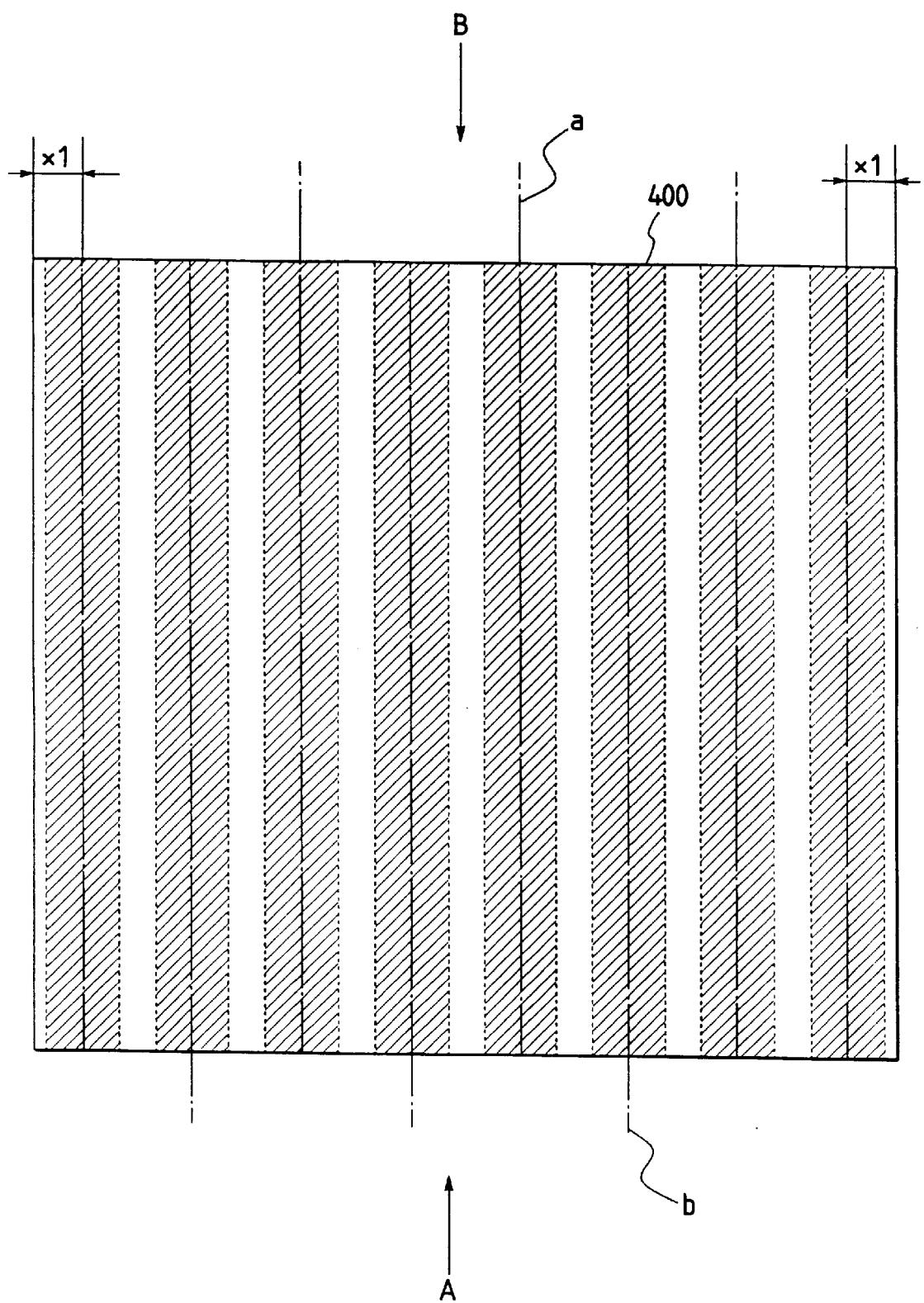
FIG. 16 is a view which shows the relationship between the spur position and the reading position of a white reference sheet embodying the present invention.
Figure 17:
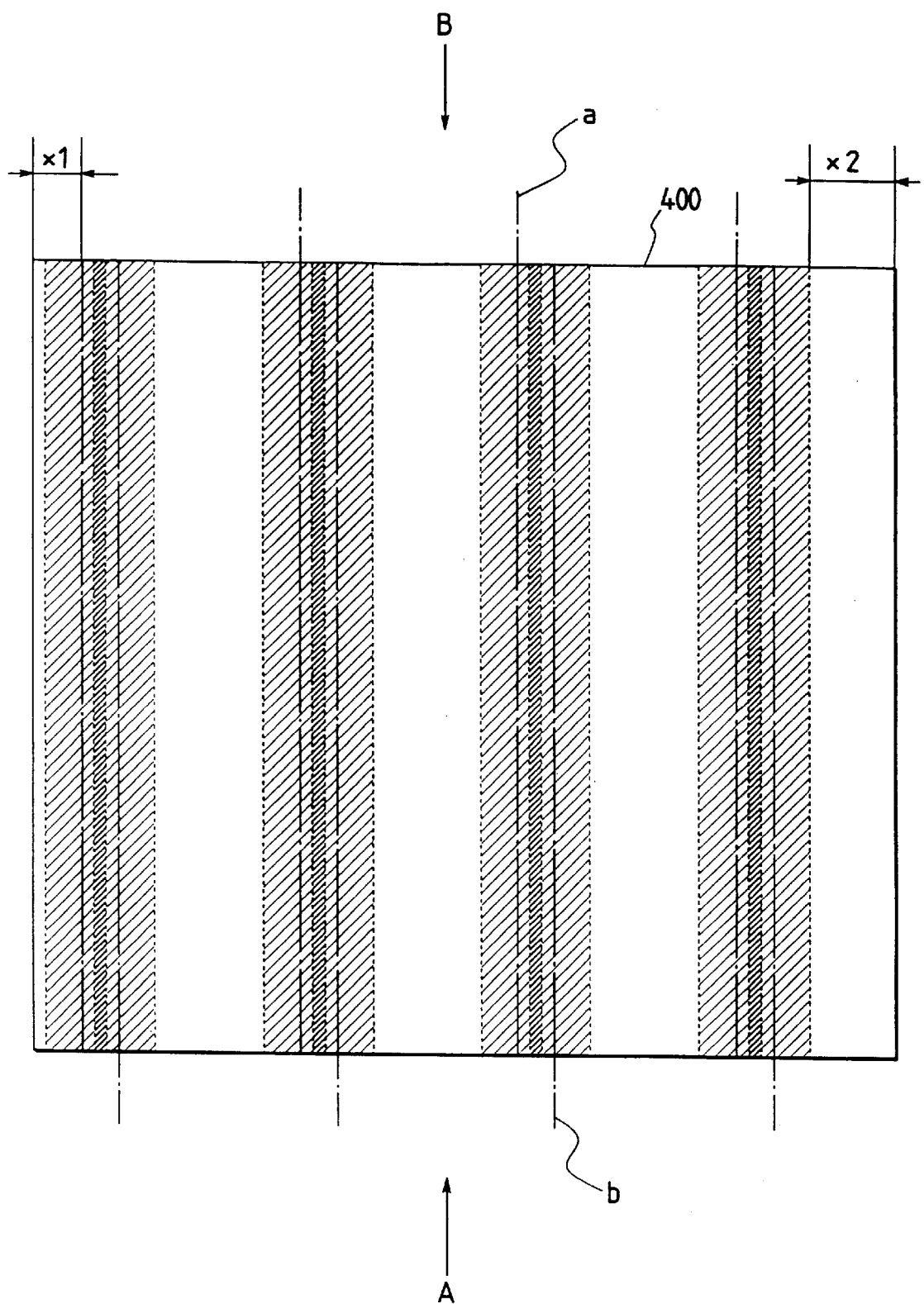
FIG. 17 is a view which shows the relationship between the spur position and the reading position of a white reference sheet embodying the present invention.

If spurs are arranged on the straight lines a as shown in FIG. 16, each of the gaps between the spurs is the same as those shown in the mode of the first embodiment. For example, however, if the insertion is inverted 180 degrees to make it in the reversed direction, the loci of the spurs become as indicated by straight lines b, thus distributing the regions of possible contact as if these were interpolated each other. In this case, it is difficult to make the required correction while evading such regions of possible contact. Here, therefore, if the white reference sheet 400 should be rotated 180 degrees for insertion, the left edge of the white reference sheet 400 is placed away from the left reference guide by a given amount when inserted. Then, it becomes possible to secure wider blank regions as shown in FIG. 17. In this way, the reference position of insertion of a sheet for use of correction is set differently from the reference position of insertion of a recording sheet or a document depending on the arrangement of spurs or others that may be regarded as factors to vary characteristics of a sheet member for use of correction, such as the white reference sheet 400. In this respect, the left edge of the white reference sheet 400 is placed away from the insertion reference guide in FIG. 17, but this arrangement is not necessarily confined thereto. For example, it may be possible to change the inserting position of the left edge by shifting the left reference guide 30 shown in FIG. 1 to the right as required. Any other structures than those described above are the same as those referred to in the first embodiment.

(Third Embodiment)

The present invention is not necessarily limited to the recording apparatus, which is provided with an image reading function as in the mode of the previous embodiments. For example, it may be possible to adopt an apparatus dedicated to reading images. In such a case, it is possible to obtain a good result of image reading by evading the occurrence of any variation of characteristics that may be brought to a sheet member for use of correction the transfer of paper particles or the like to such sheet member from the carrier rollers to which these particles have adhered as described earlier or by the damages given to it due to sliding on the sliding member of the sheet insertion guide or the like.

Figure 18:
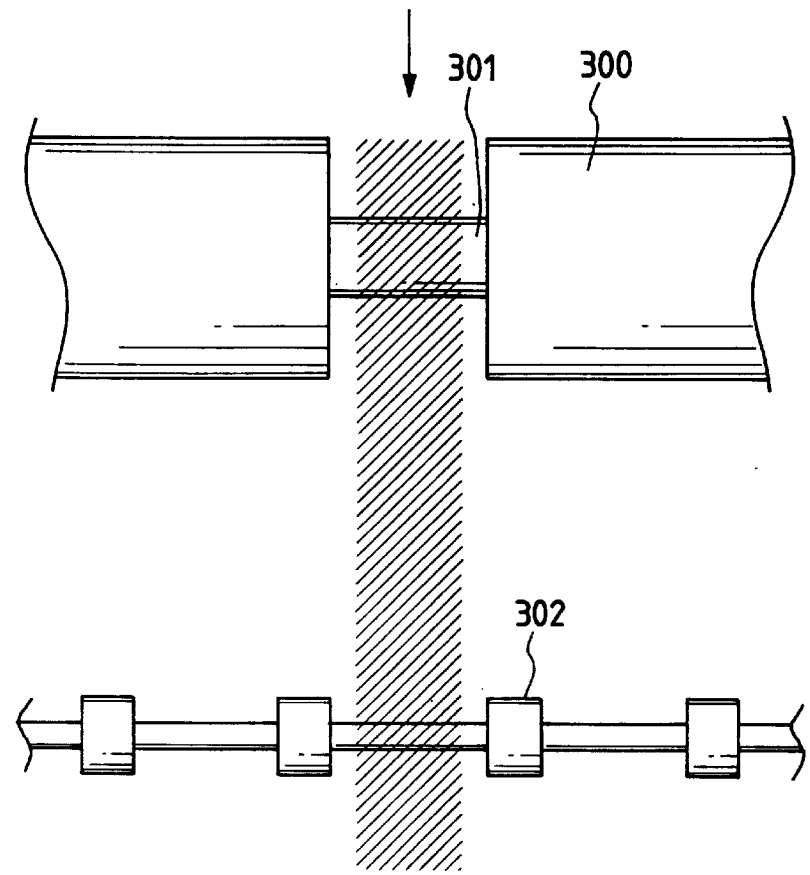
FIG. 18 is a view which shows the relationship between the spur position and the reading position of a white reference sheet for an image reading apparatus embodying the present invention.
Figure 19:
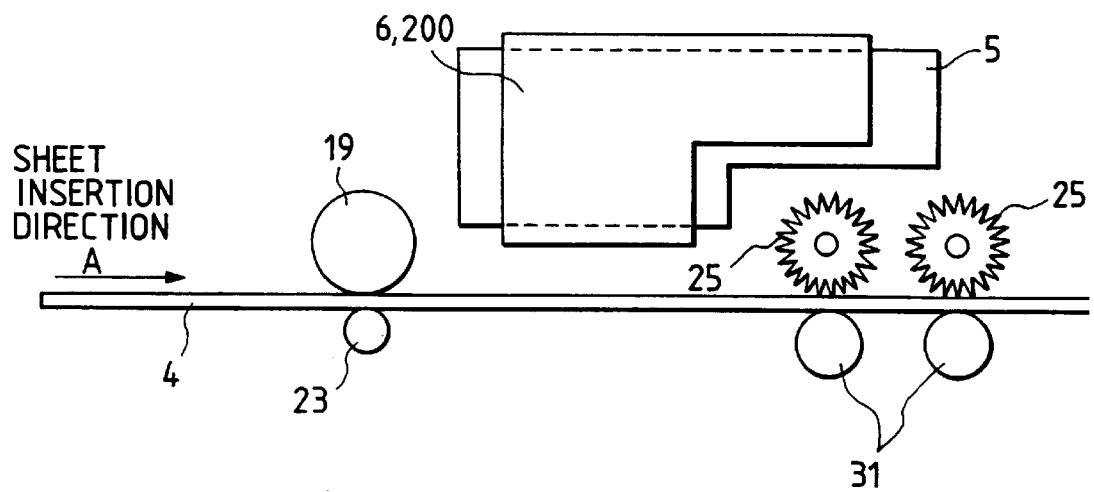
FIG. 19 is a vertically sectional view which schematically shows the brief structure of a sheet carrying unit of an apparatus embodying the present invention.

FIG. 18 illustrates one example of such image reading apparatus. In FIG. 18, a reference numeral 300 designates a sheet carrier roller formed by arranging a neck portion 301 for it, thus makes it possible to evade any contact between a document and the carrier roller 300. In this way, it is made possible to prevent the white reference sheet 400 from being stained when it is in contact with the roller. Also, the region indicated by hatching is the one where a reading is executed, and at the same time, it is the region other than those regions where the sheet carrier roller 300 and the sheet expelling rollers 302 arranged for a document are in contact with the sheet on its reading surface side.

Here, in accordance with the mode of the present embodiment, the description has been made of a reading apparatus structured to arrange a sheet carrier roller for a document on its reading surface side, but it is not necessarily confined to this arrangement. For example, a carrier roller is arranged on the opposite side of the reading surface, while pinch rollers are arranged on the reading surface side. In this case, a neck portion is provided for each pinch roller or reading is performed on the position where pinch rollers are not arranged.

(Fourth Embodiment)

Further, in conjunction with FIGS. 19, 20A, 20B and 21, the description will be made of modes of another embodiment in accordance with the present invention. The present embodiment is applicable to both a recording apparatus having an image reading function and an apparatus dedicated to image reading. With this embodiment, an optimum shading distortion can be simply executed (a gap is easily provided in the conversion output at least with respect to the white reference when the black and white references are executed), provided that the direction is always constant for a white reference reflection sheet to be inserted into an apparatus, and that a control is given so as not to allow the white reference correction regions to be in contact with any roller member on the sheet expelling side. In the present embodiment, when the shading distortion of the image reading head 200 is detected, the inserted white reference reflection sheet 400 is carried in the same direction as the images of a document are read, and when the white reference reflection sheet 400 has carried to a given position, the shading distortion is detected by the image reading head 200. When the detection of the shading distortion in the given position is completed, the white reference reflection sheet 400 is expelled in the direction opposite to the expelling direction of the recording medium and the document (in the direction toward the right side in FIG. 19). In other words, the structure is arranged to expel it to the insertion inlet side.

Figure 20B:
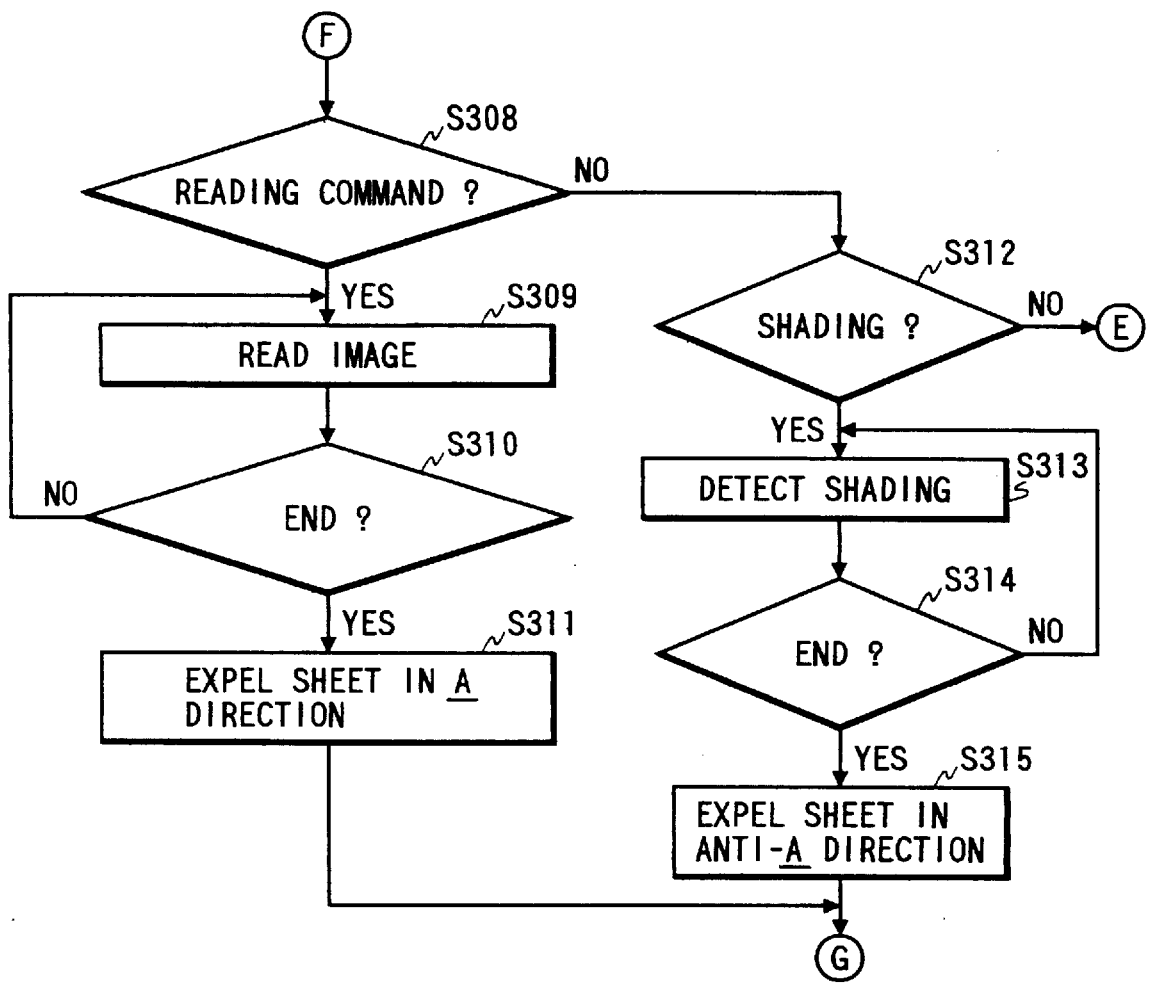
FIG. 20 is comprised of FIGS. 20A and 20B showing flowcharts which illustrate another operational procedure embodying the present invention.

Now, using a flowchart shown in FIGS. 20A and 20B, the description will be made of one example of the operation of a recording apparatus in accordance with the present embodiment. In FIGS. 20A and 20B, the sheet sensor 35 detects whether or not any sheet member 4 is inserted in step S301, at first. If a sheet member 4 is inserted, the sheet member 4 is carried to a given position (a position where the head of the sheet protrudes, for example). Then, in step S303, the process waits for a command to be transmitted from a host apparatus through an interface 506. When the command is received, the process proceeds to step S304 to determine whether or not it is a recording command.

Figure 21:
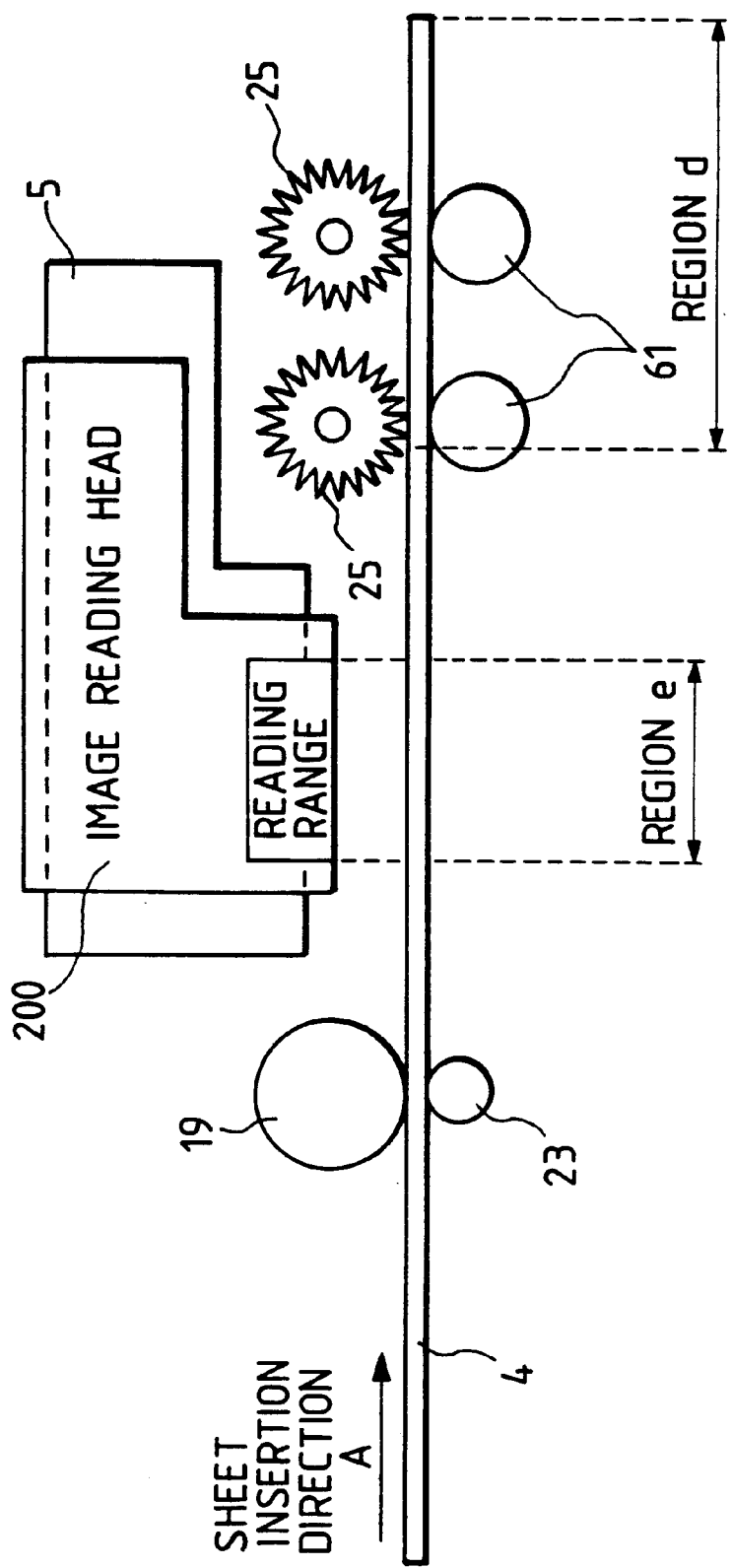
FIG. 21 is a vertically sectional view which schematically shows the sheet carrying unit and illustrates the state of carrying and expelling a sheet when image reading means detects shading distortion in accordance with an embodiment of the present invention.

If the command is for recording, the process proceeds to step S305 to execute recording while carrying the sheet member 4 in the direction indicated by an arrow A. In step S306, when the recording is completed, the process proceeds to step S307 to expel the sheet member 4 in the direction indicated by the arrow A (in the same direction as the sheet is being carried). In the step S304, if the received command is other than a recording one, the process proceeds to showing a unit for carrying a sheet member, which illustrates the carrying and expelling of a sheet member 4 (a white reference reflection sheet 400) when detecting the shading distortion of the image reading head 200 described above. In FIG. 21, when the white reference reflection sheet 400 is inserted in the direction indicated by an arrow A and a command is for detecting the shading distortion, the white reference reflection sheet 400 is carried in the same direction as a document to a position shown in FIG. 21 (a given position). In that position, the shading distortion of the image reading means (head) 200 is detected by utilizing the region e of the white reference reflection sheet 400.

Figure 12:
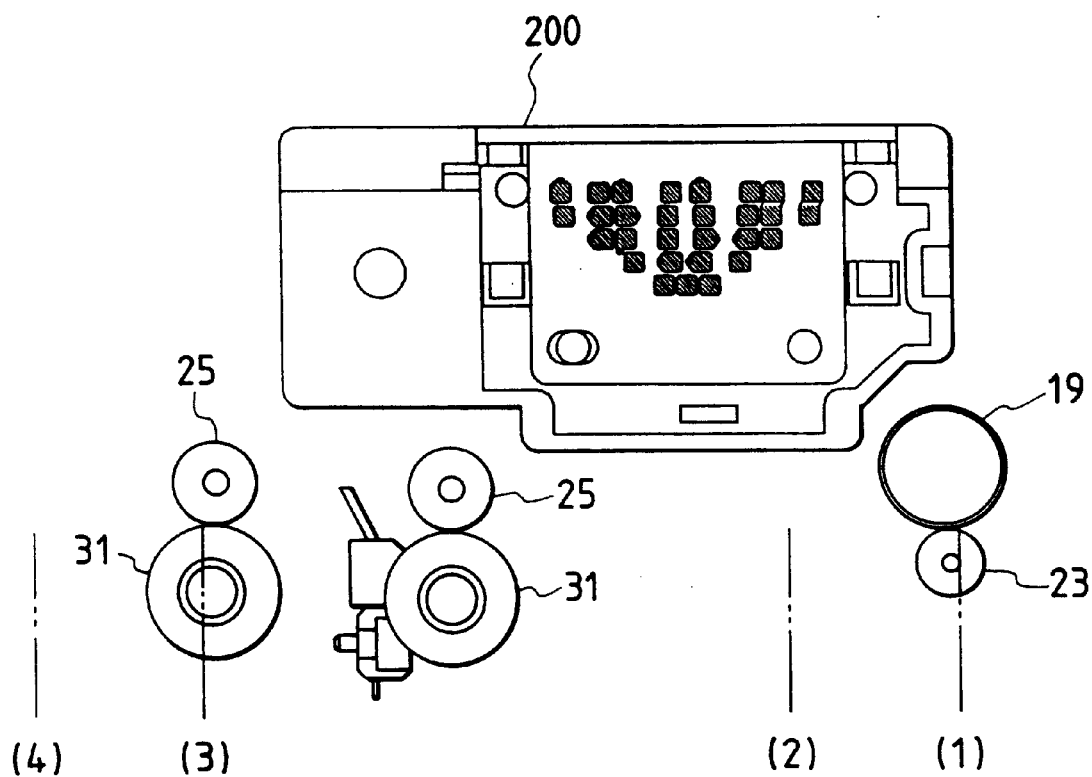
FIG. 12 is a view which schematically shows the carrying position of a white reference sheet.

When the detection of the shading distortion is completed, the sheet carrier roller 19 is driven in the reverse direction to expel the white reference reflection sheet 400 in the direction (toward the left side), which is opposite to the expelling direction of a recording medium and a document (the direction indicated by the arrow A in FIG. 21). The region d of the white reference reflection sheet 400 shown in FIG. 12 is the one where the white reference reflection sheet passes the spurs 25 when the shading distortion is detected.

As described above, in accordance with the detection of the shading distortion, the white step S108 to determine whether or not it is for image reading.

If the command is for image reading, the process proceeds to step S309 to execute reading while carrying a sheet member (a document) 4 in the direction indicated by an arrow A, and in step S310, when the reading is completed, the process proceeds to step S311 to expel the sheet member 4 in the direction indicated by the arrow A (in the same direction as it is being carried). In the step S308, if the command is other than the one for reading, the process proceeds to step S312 to determine whether or not the received command is for the detection of shading distortion of the reading means (reading head) 200.

If the command is for detecting the shading distortion, the process proceeds to step S313 to execute the detection of the shading distortion of the reading means (head) 200, and then, in step S314, it is determined whether or not the detection of the shading distortion is completed. If negative, the detection of the shading distortion is further continued in this step S314. When the detection of the shading distortion of the image reading head 200 is completed, the sheet member 4 (a white reference reflection sheet 400) is expelled in step S315 in the direction opposite to the one indicated by an arrow L in FIG. 2.

FIG. 21 is a cross-sectional view schematically reference reflection sheet 400 is drawn (carried) from the sheet member insertion inlet to the position shown in FIG. 21 in the direction indicated by the arrow A, and then, the shading distortion of the image reading head 200 is detected. After that, the white reference reflection sheet 400 is carried in the direction opposite to the direction indicated by the arrow A if it should be expelled. Therefore, the region where the white reference reflection sheet 400 passes the spurs 25 is only the region d shown in FIG. 21.

As a result, in the region e (in FIG. 21) where the shading distortion is detected for the white reference reflection sheet 400, no contact is made between the sheet and spurs 25. There are no loci of the spurs on the sheet. Consequently, the white surface of the region e where the shading distortion is detected is not stained or damaged by the spurs 25, simply because no spurs are in contact with that surface, making it possible to correct shading accurately. Also, the white reference reflection sheet 400 is carried in the same direction as the direction of image reading when it advances from the sheet member insertion inlet to the detecting position of the shading distortion. As a result, the condition of the sheet member is in the same state of image reading. This arrangement also contributes to making the shading correction accurately. Any other structures than these described above are the same as those of the first embodiment.

Here, in each of the embodiments described above, ink jet recording means is exemplified as recording means (recording head) 6 in each of the descriptions thereof. However, the present invention is equally applicable to the recording means of an electro-photographic method, wire-dot method, thermosensitive method, thermal transfer method, laser beam method or some other methods, and the same effects are obtainable.

Also, in each of the embodiments described above, a serial recording method, in which the recording head and reading head are arranged to travel in the main scanning direction, is exemplified in each of the descriptions thereof. However, the present invention is equally applicable to the line recording method wherein recording is made only in the sub-scanning direction by use of line recording means having a length to cover the entire width of a sheet member or a part thereof, and the same effects are obtainable.

In accordance with the embodiment as has been described in detail as above, it is possible to obtain an image reading apparatus and an information processing apparatus having an image reading function, which are capable of executing the correction of the converted image signals of reading means without staining the white surface to be used for correcting a white reference member.

What is claimed is:

1. An image reading apparatus comprising:

reading means for reading a document arranged in an image reading position to produce image signals and for reading a reference member to produce correction signals;

correction means for correcting a distortion of the image signals in accordance with the correction signals and the reference member to produce correction data;

carrying means for guiding the document and the reference member to the image reading position;

expelling means for expelling the document and the reference member from the image reading position; and controlling means for controlling and obtaining the corrected data from said correction means by guiding the reference member using said carrying means to the image reading position in order for said reading means to read regions of the reference member not contacted by said expelling means, wherein said correction means performs a shading correction of said reading means.

2. An image reading apparatus according to claim 1, wherein said expelling means is provided with a conveying rotary member, and said controlling means controls said reading means to read portions of the reference member not contacted by said conveying rotary member.

3. An image reading apparatus according to claim 1, wherein a width of the regions of the reference member not contacted by said expelling means is larger than a reading width of said reading means.

4. An image reading apparatus according to claim 1, wherein a first relative position of said carrying means and the reference member in the direction orthogonal to the carrying direction of the reference member is provided when said reading means reads the reference member in a first direction and a second relative position is provided when said reading means reads the reference member in a second direction.

5. An image reading apparatus according to claim 1, wherein an expelling direction of the reference member from said image reading position is in a direction away from a side of said apparatus where said expelling means is arranged.

6. An image reading apparatus according to claim 1, wherein said controlling means controls said correction means to correct said image signals using an average value of data read from the reference member multiple times by said reading means.

7. An image reading apparatus according to claim 1, wherein said reading means reads the document by scanning in a subscanning direction orthogonal to a carrying direction of the document by said carrying means.

8. An information processing apparatus capable of selectively mounting thereon reading means for reading a document in an image reading position to produce image signals and for reading a reference member to produce correction signals and recording means for recording on a recording medium, said apparatus comprising:

correction means for correcting a distortion of the image signals produced by the reading means in accordance with the correction signals and the reference member, said correction means producing correction data;

carrying means for guiding the document and the reference member to the image reading position;

expelling means for expelling the recording medium from said image processing apparatus; and controlling means for controlling and obtaining the correction data from said correction means by using the reading means to read the regions of the reference member not contacted by said expelling means, wherein said correction means performs a shading correction of the reading means.

9. An information processing apparatus according to claim 8, wherein said expelling means is provided with conveying rotary member, and said controlling means controls said reading means to read portions of the reference member not contacted by said conveying rotary member.

10. An information processing apparatus according to claim 8, wherein a width of the regions of the reference member not contacted by said expelling means is larger than a reading width of said reading means.

11. An information proceeding apparatus according to claim 8, wherein a first relative position of said carrying means and the reference member in the direction orthogonal to a carrying direction of the reference member is provided when said reading means reads said reference member in a first direction and a second relative position is provided when said reading means reads the reference member in a second direction.

12. An information processing apparatus according to claim 8, wherein an expelling direction of the reference member from said image proceeding apparatus is in a direction away from a side of said information processing apparatus where said expelling means is arranged.

13. An information processing apparatus according to claim 8, wherein said controlling means controls said correction means to correct the image signals using a average value of data read from the reference member multiple times by said reading means.

14. An information processing apparatus according to claim 8, wherein said recording means records using an ink jet recording method.

15. An information processing apparatus according to claim 14, wherein said recording means is provided with, electrothermal transducing elements to discharge ink using thermal energy generated by said electrothermal transducing elements.

16. An information processing apparatus capable of mounting thereon reading means for reading a document to produce image signals and for reading a reference member to produce correction signals, said apparatus comprising:

correction means for correcting a distortion of the image signals produced by the reading means in accordance with the correction signals and the reference member, said correction means producing corrected data;

carrying means for guiding the document and the reference member to an image reading position;

expelling means for expelling said recording medium from said image processing apparatus; and controlling means for controlling and obtaining said corrected data from said correction means by using the reading means to read regions of the reference member not contacted by said expelling means using the reading means, wherein said correction means performs a shading correction of the reading means.

17. An information processing apparatus according to claim 16, wherein said expelling means is provided with a conveying rotary member, and said controlling means controls said reading means to read portions of said reference member not contacted by said conveying rotary member.

18. An information processing apparatus according to claim 16, wherein a width of said regions of said reference member not contacted by said expelling means is larger than a reading width of said reading means.

19. An information proceeding apparatus according to claim 16, wherein a first relative position of said carrying means and said reference member in the direction orthogonal to the carrying direction of said reference member is provided when said reading means reads said reference member in a first direction and a second relative position is provided when said reading means reads said reference member in a second direction.

20. An information processing apparatus according to claim 16, wherein an expelling direction of said reference member from said image proceeding apparatus is in a direction away from a side of said apparatus where said expelling means is arranged.

21. An information processing apparatus according to claim 16, wherein said controlling means controls said correction means to correct said image signals using the average value of data read from said reference member multiple times by said reading means.

* * * * *

UNITED STATES PATENT AND TRADEMARK OFFICE
CERTIFICATE OF CORRECTION

PATENT NO. : 6,246,484 B1
DATED : June 12, 2001
INVENTOR(S) : Yoshiyuki Shimamura et al.

It is certified that error appears in the above-identified patent and that said Letters Patent is hereby corrected as shown below:

Column 2,
Line 3, "are" should read -- is --.
Line 18, "designed" should read -- designed to --.

Column 7,
Line 52, "monochromic" should read -- monochromatic --.

Column 9,
Line 67, "it is" should read -- is it --.

Column 11,
Line 12, "sensor 41," should read -- sensor 35, --.

Column 12,
Line 36, "is" should be deleted.

Column 14,
Line 10, "step S217," should read -- step S213, --.
Line 46, "step S81," should read -- step S82, --.

Column 15,
Line 62, "correction" should read -- correcting --.

Column 16,
Line 4, "makes" should read -- making --.

Column 17,
Lines 4 through 25 should be deleted.
Line 26, "the shading distortion, the white step S108" should read -- step S308 --.
Line 50, "schematically reference" should read -- schematically showing a unit for carrying a sheet member, which illustrates the carrying and expelling of a sheet member 4 (a white reference reflection sheet 400) when detecting the shading distortion of the image reading head 200 described above. In FIG. 21, when the white reference reflection sheet 400 is inserted in the direction indicated by an arrow A and a command is for detecting the shading distortion, the white reference reflection sheet 400 is carried in the same direction as a document to a position shown in FIG. 21 ( a given position). In that position, the shading distortion of the image reading means (head) 200 is detected by utilizing the region e of the white reference reflection sheet 400.

UNITED STATES PATENT AND TRADEMARK OFFICE
CERTIFICATE OF CORRECTION

PATENT NO. : 6,246,484 B1
DATED : June 12, 2001
INVENTOR(S) : Yoshiyuki Shimamura et al.

It is certified that error appears in the above-identified patent and that said Letters Patent is hereby corrected as shown below:

When the detection of the shading distortion is completed, the sheet barrier roller 19 is driven in the reverse direction to expel the white reference reflection sheet 400 in the direction (toward the left side), which is opposite to the expelling direction of a recording medium and a document (the direction indicated by the arrow A in FIG. 21). The region d of the white reference reflection sheet 400 shown in FIG. 12 is the one where the white reference reflection sheet passes the spurs 25 when the shading distortion is detected.

As described above, in accordance with the detection of the shading distortion, the white reference --.

Column 19,
Line 41, "with" should read -- with a --.
Lines 49 and 59, "proceeding" should read -- processing --.

Column 20,
Line 3, "a" should read -- an --.
Line 9, "with," should read -- with --.
Lines 42 and 52, "proceeding" should read -- processing --.
Line 57, "the" should read -- an --.

Signed and Sealed this

Thirtieth Day of April, 2002

*Attest:*

JAMES E. ROGAN
*Attesting Officer*    Director of the United States Patent and Trademark Office